(12) United States Patent
Palmer

(10) Patent No.: US 12,001,420 B2
(45) Date of Patent: Jun. 4, 2024

(54) DISCONNECTED OPERATION WITHIN DISTRIBUTED DATABASE SYSTEMS

(71) Applicant: NuoDB, Inc., Cambridge, MA (US)

(72) Inventor: Trek Skyward Palmer, Cambridge, MA (US)

(73) Assignee: NuoDB, Inc., Waltham, MA (US)

(*) Notice: Subject to any disclaimer, the term of this patent is extended or adjusted under 35 U.S.C. 154(b) by 0 days.

(21) Appl. No.: 17/572,347

(22) Filed: Jan. 10, 2022

(65) Prior Publication Data

US 2022/0253427 A1 Aug. 11, 2022

Related U.S. Application Data

(63) Continuation of application No. 16/213,695, filed on Dec. 7, 2018, now Pat. No. 11,222,008, which is a (Continued)

(51) Int. Cl.
G06F 16/23 (2019.01)
G06F 16/27 (2019.01)

(52) U.S. Cl.
CPC ...... *G06F 16/2365* (2019.01); *G06F 16/2315* (2019.01); *G06F 16/273* (2019.01)

(58) Field of Classification Search
CPC ........ G06F 3/067; G06F 16/27; G06F 3/0608; G06F 11/1471; G06F 21/6218;
(Continued)

(56) References Cited

U.S. PATENT DOCUMENTS 4,853,843 A 8/1989 Ecklund
5,446,887 A 8/1995 Berkowitz
(Continued)

FOREIGN PATENT DOCUMENTS

CN 1477562 A 2/2004
CN 1784676 A 6/2006
(Continued)

OTHER PUBLICATIONS

Distributed Disconnected Databases by Leslie Klieb, © 1996 ACM 0-89791-820-7 96 0002 3.50 (Year: 1996).*
(Continued)

*Primary Examiner* — Hau H Hoang
(74) *Attorney, Agent, or Firm* — Smith Baluch LLP

(57) ABSTRACT

Techniques are disclosed for disconnected operation in a distributed database system. In an embodiment, the distributed database system implements a disconnected mode of operation allowing isolated regions of database nodes to provisionally commit transactions, with the global requirements of those transactions later satisfied by a transparent healing process after network connectivity is reestablished between the regions. The healing process, in turn, enables the distributed database system to construct a consistent global state of the database that accounts for the transactions provisionally-committed in each isolated region during the disconnected mode. Once the healing process completes, database clients "see" a healed version of the database that simulates or otherwise closely approximates a state of the database had the distributed database system performed the transactions during a normal, fully-connected, mode of operation.

19 Claims, 11 Drawing Sheets

Related U.S. Application Data continuation of application No. 14/726,200, filed on May 29, 2015, now Pat. No. 10,180,954.

(58) Field of Classification Search
CPC .... G06F 16/2379; G06F 16/29; G06F 16/273; G06F 16/23; G06F 16/21; G06F 9/466; G06F 16/252; G06F 11/2023; G06F 11/2074; G06F 11/2082; G06F 16/275; G06F 11/1474

See application file for complete search history.

(56) References Cited

U.S. PATENT DOCUMENTS

| | | | |
|---|---|---|---|
| 5,524,240 A | 6/1996 | Barbara et al. | |
| 5,555,404 A | 9/1996 | Torbjornsen et al. | |
| 5,568,638 A | 10/1996 | Hayashi et al. | |
| 5,701,467 A | 12/1997 | Freeston | |
| 5,764,877 A | 6/1998 | Lomet et al. | |
| 5,960,194 A | 9/1999 | Choy et al. | |
| 6,216,151 B1 | 4/2001 | Antoun | |
| 6,226,650 B1 | 5/2001 | Mahajan et al. | |
| 6,275,863 B1 | 8/2001 | Leff et al. | |
| 6,334,125 B1 | 12/2001 | Johnson et al. | |
| 6,401,096 B1 | 6/2002 | Zellweger | |
| 6,424,967 B1 | 7/2002 | Johnson et al. | |
| 6,480,857 B1 | 11/2002 | Chandler | |
| 6,499,036 B1 | 12/2002 | Gurevich | |
| 6,523,036 B1 | 2/2003 | Hickman et al. | |
| 6,748,394 B2 | 6/2004 | Shah et al. | |
| 6,792,432 B1 | 9/2004 | Kodavalla et al. | |
| 6,862,589 B2 | 3/2005 | Grant | |
| 7,026,043 B2 | 4/2006 | Jander | |
| 7,080,083 B2 | 7/2006 | Kim et al. | |
| 7,096,216 B2 | 8/2006 | Anonsen | |
| 7,219,102 B2 | 5/2007 | Zhou et al. | |
| 7,233,960 B1 | 6/2007 | Boris et al. | |
| 7,293,039 B1 | 11/2007 | Deshmukh et al. | |
| 7,353,227 B2 | 4/2008 | Wu | |
| 7,395,352 B1 | 7/2008 | Lam et al. | |
| 7,401,094 B1 | 7/2008 | Kesler | |
| 7,403,948 B2 | 7/2008 | Ghoneimy et al. | |
| 7,562,102 B1 | 7/2009 | Sumner et al. | |
| 7,853,624 B2 | 12/2010 | Friedlander et al. | |
| 7,890,508 B2 | 2/2011 | Gerber et al. | |
| 8,108,343 B2 | 1/2012 | Wang et al. | |
| 8,224,860 B2 | 7/2012 | Starkey | |
| 8,266,122 B1 | 9/2012 | Newcombe et al. | |
| 8,504,523 B2 | 8/2013 | Starkey | |
| 8,583,598 B2 | 11/2013 | Shaull et al. | |
| 8,756,237 B2 | 6/2014 | Stillerman et al. | |
| 9,489,443 B1 | 11/2016 | Muniswamy-Reddy et al. | |
| 9,501,363 B1 | 11/2016 | Ottavio | |
| 9,697,253 B2 | 7/2017 | Chidambaran et al. | |
| 9,734,021 B1 | 8/2017 | Sanocki et al. | |
| 10,037,348 B2 | 7/2018 | Proctor et al. | |
| 10,067,969 B2 | 9/2018 | Rice et al. | |
| 10,180,954 B2 | 1/2019 | Palmer | |
| 10,884,869 B2 | 1/2021 | Shaull | |
| 11,222,008 B2 | 1/2022 | Palmer | |
| 11,314,714 B2 | 4/2022 | Rice et al. | |
| 2002/0026603 A1* | 2/2002 | LeCrone | G06F 11/2064 714/6.31 |
| 2002/0112054 A1 | 8/2002 | Hatanaka | |
| 2002/0152261 A1 | 10/2002 | Arkin et al. | |
| 2002/0152262 A1 | 10/2002 | Arkin et al. | |
| 2002/0178162 A1 | 11/2002 | Ulrich et al. | |
| 2003/0051021 A1 | 3/2003 | Hirschfeld et al. | |
| 2003/0149709 A1* | 8/2003 | Banks | G06F 16/273 |
| 2003/0204486 A1 | 10/2003 | Berks et al. | |
| 2003/0220935 A1 | 11/2003 | Vivian et al. | |
| 2004/0153459 A1 | 8/2004 | Whitten et al. | |
| 2004/0263644 A1 | 12/2004 | Ebi | |
| 2005/0013208 A1 | 1/2005 | Hirabayashi et al. | |
| 2005/0086384 A1 | 4/2005 | Ernst | |
| 2005/0198062 A1 | 9/2005 | Shapiro | |
| 2005/0216502 A1 | 9/2005 | Kaura et al. | |
| 2006/0010130 A1 | 1/2006 | Leff et al. | |
| 2006/0235823 A1 | 10/2006 | Chong et al. | |
| 2007/0067349 A1 | 3/2007 | Jhaveri et al. | |
| 2007/0073829 A1 | 3/2007 | Volodarsky et al. | |
| 2007/0198599 A1* | 8/2007 | Tobies | G06F 16/2379 |
| 2008/0086470 A1 | 4/2008 | Graefe | |
| 2008/0228795 A1 | 9/2008 | Lomet | |
| 2008/0320038 A1 | 12/2008 | Liege | |
| 2009/0113431 A1 | 4/2009 | Whyte | |
| 2010/0094802 A1 | 4/2010 | Luotojarvi et al. | |
| 2010/0115246 A1 | 5/2010 | Seshadri et al. | |
| 2010/0153349 A1 | 6/2010 | Schroth et al. | |
| 2010/0191884 A1 | 7/2010 | Holenstein et al. | |
| 2010/0235606 A1 | 9/2010 | Oreland et al. | |
| 2010/0241614 A1 | 9/2010 | Shaull et al. | |
| 2010/0297565 A1 | 11/2010 | Waters et al. | |
| 2011/0087874 A1 | 4/2011 | Timashev et al. | |
| 2011/0225167 A1 | 9/2011 | Bhattacharjee et al. | |
| 2011/0231447 A1 | 9/2011 | Starkey | |
| 2011/0302583 A1 | 12/2011 | Abadi et al. | |
| 2012/0102022 A1 | 4/2012 | Miranker et al. | |
| 2012/0136904 A1 | 5/2012 | Venkata Naga Ravi | |
| 2012/0254175 A1 | 10/2012 | Horowitz et al. | |
| 2013/0060922 A1 | 3/2013 | Koponen et al. | |
| 2013/0110766 A1 | 5/2013 | Promhouse et al. | |
| 2013/0110774 A1 | 5/2013 | Shah et al. | |
| 2013/0110781 A1 | 5/2013 | Golab et al. | |
| 2013/0159265 A1 | 6/2013 | Peh et al. | |
| 2013/0159366 A1 | 6/2013 | Lyle et al. | |
| 2013/0179482 A1 | 7/2013 | Becker et al. | |
| 2013/0232378 A1 | 9/2013 | Resch et al. | |
| 2013/0262403 A1 | 10/2013 | Milousheff et al. | |
| 2013/0278412 A1 | 10/2013 | Kelly et al. | |
| 2013/0290249 A1 | 10/2013 | Merriman et al. | |
| 2013/0297565 A1 | 11/2013 | Starkey | |
| 2013/0311424 A1 | 11/2013 | Rodrigo | |
| 2013/0311426 A1 | 11/2013 | Erdogan et al. | |
| 2014/0095450 A1 | 4/2014 | Marwah et al. | |
| 2014/0108414 A1 | 4/2014 | Stillerman et al. | |
| 2014/0108633 A1 | 4/2014 | Dai et al. | |
| 2014/0149353 A1 | 5/2014 | Lee et al. | |
| 2014/0172914 A1 | 6/2014 | Elnikety et al. | |
| 2014/0279881 A1 | 9/2014 | Tan et al. | |
| 2014/0279929 A1 | 9/2014 | Gupta et al. | |
| 2014/0297676 A1 | 10/2014 | Bhatia et al. | |
| 2014/0304306 A1 | 10/2014 | Proctor et al. | |
| 2014/0310260 A1 | 10/2014 | Wu et al. | |
| 2015/0019496 A1 | 1/2015 | Stewart et al. | |
| 2015/0019739 A1 | 1/2015 | Attaluri et al. | |
| 2015/0032695 A1 | 1/2015 | Tran et al. | |
| 2015/0066858 A1 | 3/2015 | Sabdar et al. | |
| 2015/0128063 A1 | 5/2015 | Jones et al. | |
| 2015/0135255 A1 | 5/2015 | Theimer et al. | |
| 2015/0149513 A1 | 5/2015 | Beigel et al. | |
| 2015/0199415 A1 | 7/2015 | Bourbonnais et al. | |
| 2015/0370505 A1 | 12/2015 | Shuma et al. | |
| 2016/0134490 A1 | 5/2016 | Balasubramanyan et al. | |
| 2016/0306709 A1 | 10/2016 | Shaull et al. | |
| 2016/0350357 A1 | 12/2016 | Palmer | |
| 2016/0371355 A1 | 12/2016 | Massari et al. | |
| 2017/0039099 A1 | 2/2017 | Ottavio | |
| 2018/0357264 A1 | 12/2018 | Rice et al. | |
| 2021/0173746 A1 | 6/2021 | Shaull | |
| 2022/0253427 A1 | 8/2022 | Palmer | |

FOREIGN PATENT DOCUMENTS

| | | |
|---|---|---|
| CN | 102436490 A | 5/2012 |
| CN | 102667711 A | 9/2012 |
| EA | 002931 B1 | 10/2002 |
| EP | 1403782 A2 | 3/2004 |
| JP | 2003256256 A | 9/2003 |
| JP | 2006048507 A | 2/2006 |
| JP | 2007058275 A | 3/2007 |
| RU | 2315349 C1 | 1/2008 |

(56) References Cited

FOREIGN PATENT DOCUMENTS

| RU | 2008106904 A | 8/2009 |
|---|---|---|
| WO | 2006090367 A2 | 8/2006 |

OTHER PUBLICATIONS

Non-Final Office Action dated Feb. 6, 2014 from U.S. Appl. No. 13/933,483, 14 pp.
Non-Final Office Action dated Jan. 21, 2016 from U.S. Appl. No. 14/215,401, 19 pp.
Non-Final Office Action dated Jun. 1, 2017 from U.S. Appl. No. 14/215,461, 21 pp.
Non-Final Office Action dated Jun. 2, 2017 from U.S. Appl. No. 14/744,546, 25 pp.
Non-Final Office Action dated May 19, 2016 from U.S. Appl. No. 14/247,364, 24 pp.
Non-Final Office Action dated May 31, 2017 from U.S. Appl. No. 14/215,401, 27 pp.
Non-Final Office Action dated Oct. 10, 2012 from U.S. Appl. No. 13/525,953, 8 pp.
Non-Final Office Action dated Sep. 11, 2017 from U.S. Appl. No. 14/725,916, 17 pages.
Non-Final Office Action dated Sep. 19, 2017 from U.S. Appl. No. 14/726,200, 37 pages.
Non-Final Office Action dated Sep. 21, 2017 from U.S. Appl. No. 14/688,396, 31 pages.
Non-Final Office Action dated Sep. 23, 2016 from U.S. Appl. No. 14/616,713, 8 pp.
Notice of Allowance dated Apr. 1, 2013 from U.S. Appl. No. 13/525,953, 10 pp.
Notice of Allowance dated Feb. 29, 2012 from U.S. Appl. No. 13/051,750, 8 pp.
Notice of Allowance dated Jul. 27, 2016 from U.S. Appl. No. 14/215,372, 12 pp.
Notice of Allowance dated May 14, 2012 from U.S. Appl. No. 13/051,750, 8 pp.
Notice of Allowance dated May 3, 2018 for U.S. Appl. No. 14/725,916, 13 pages.
Oracle Database Concepts 10g Release 2 (10.2), Oct. 2005, 14 pages.
Özsu et al., Principles of distributed database systems. Springer Science & Business Media, Chapter 13—Data Replication, 2011. 41 pages.
Rahimi, S. K. et al., "Distributed Database Management Systems: A Practical Approach," IEEE Computer Society, John Wiley & Sons, Inc. Publications (2010), 765 pp.
Roy, N. et al., "Efficient Autoscaling in the Cloud using Predictive Models for Workload Forecasting," IEEE 4th International Conference on Cloud Computing, 2011, pp. 500-507.
Searchcloudapplications.techtarget.com, Autoscaling Definition, Aug. 2012, 1 page.
Shaull et al., "Skippy: a new snapshot indexing method for time travel in the storage manager." Proceedings of the 2008 ACM SIGMOD international conference on Management of data. ACM, 2008. 12 pages.
Shaull, R. et al., "A Modular and Efficient Past State System for Berkeley DB," Proceedings of USENIX ATC '14:2014 USENIX Annual Technical Conference, 13 pp. (Jun. 19-20, 2014).
Shaull, R., "Retro: A Methodology for Retrospection Everywhere," A Dissertation Presented to the Faculty of the Graduate School of Arts and Sciences of Brandeis University, Waltham, Massachusetts, Aug. 2013, 174 pp.
Terry et al., "Managing update conflicts in Bayou, a weakly connected replicated storage system." ACM SIGOPS Operating Systems Review. vol. 29. No. 5. ACM, 1995. 12 pages.
U.S. Appl. No. 14/215,372, filed Mar. 17, 2014, Ottavio.
U.S. Appl. No. 14/215,401, filed Mar. 17, 2014, Palmer.
U.S. Appl. No. 14/215,461, filed Mar. 17, 2014, Palmer.
U.S. Appl. No. 14/616,713, filed Feb. 8, 2015, Levin.
U.S. Appl. No. 14/688,396, filed Apr. 16, 2015, Shaull.
U.S. Appl. No. 14/725,916, filed May 29, 2015, Rice.
U.S. Appl. No. 14/726,200, filed May 29, 2015, Palmer.
U.S. Appl. No. 14/744,546, filed Jun. 19, 2015, Massari.
U.S. Appl. No. 15/296,439, filed Oct. 18, 2016, Ottavio.
U.S. Appl. No. 17/109,353, filed Dec. 2, 2020, Shaull.
U.S. Appl. No. 17/572,347 filed Jan. 10, 2022, Palmer.
Veerman, G. et al., "Database Load Balancing, MySQL 5.5 vs PostgreSQL 9.1," Universiteit van Amsterdam, System & Network Engineering, Apr. 2, 2012, 51 pp.
Yousif, M. "Shared-Storage Clusters," Cluster Computing, Baltzer Science Publishers, Bussum, NL, vol. 2, No. 4, pp. 249-257 (1999).
Anonymous "Technical Whitepaper: The Architecture and Motivation for NuoDB" DBTA Download/Webinars, 2013, pp. 1-27, XP055932481, Retrieved from the Internet: URL:https://www.dbta.com/DBTA-Downloads/WhitePapers/Technical-Whitepaper-The-Architecture-and-Motivation-for-NuoDB-4419.pdf [retrieved on Jun. 17, 2022].
Notification of Oral Proceedings in EP Application No. 16804119.2 dated Jul. 8, 2022, 14 pages.
"Album Closing Policy," Background, retrieved from the Internet at URL:http://tools/wiki/display/ENG/Album+Closing +Policy (Jan. 29, 2015), 4 pp.
"Distributed Coordination in NuoDB," YouTube, retrieved from the Internet at URL:https://www.youtube.com/watch?feature=player_embedded&v=URoeHvflVKg on Feb. 4, 2015, 2 pp.
"Durable Distributed Cache Architecture", retrieved from the Internet at URL: http://www.nuodb.com/explore/newsql-cloud-database-ddc-architecture on Feb. 4, 2015, 3 pages.
"Glossary—NuoDB 2.1 Documentation / NuoDB," retrieved from the Internet at URL: http://doc.nuodb.com/display/doc/Glossary on Feb. 4, 2015, 1 pp.
"How It Works," retrieved from the Internet at URL: http://www.nuodb.com/explore/newsql-cloud-database-how-it-works?mkt_tok=3RkMMJW on Feb. 4, 2015, 4 pp.
"How to Eliminate MySQL Performance Issues," NuoDB Technical Whitepaper, Sep. 10, 2014, Version 1, 11 pp.
"Hybrid Transaction and Analytical Processing with NuoDB," NuoDB Technical Whitepaper, Nov. 5, 2014, Version 1, 13 pp.
"No Knobs Administration," retrieved from the Internet at URL: http://www.nuodb.com/explore/newsql-cloud-database-product/auto-administration on Feb. 4, 2015, 4 pp.
"NuoDB at a Glance," retrieved from the Internet at URL: http://doc.nuodb.com/display/doc/NuoDB+at+a+Glance on Feb. 4, 2015, 1 pp.
"SnapShot Albums," Transaction Ordering, retrieved from the Internet at URL:http://tools/wiki/display/ENG/Snapshot+Albums (Aug. 12, 2014), 4 pp.
"Table Partitioning and Storage Groups (TPSG)," Architect's Overview, NuoDB Technical Design Document, Version 2.0 (2014), 12 pp.
"The Architecture & Motivation for NuoDB," NuoDB Technical Whitepaper, Oct. 5, 2014, Version 1, 27 pp.
"Welcome to NuoDB Swifts Release 2.1 GA," retrieved from the Internet at URL: http://dev.nuodb.com/techblog/welcome-nuodb-swifts-release-21-ga on Feb. 4, 2015, 7 pp.
"What Is A Distributed Database? And Why Do You Need One," NuoDB Technical Whitepaper, Jan. 23, 2014, Version 1, 9 pp.
Advisory Action issued by The United States Patent and Trademark Office for U.S. Appl. No. 14/215,461, dated Jan. 10, 2017, 9 pages.
Amazon CloudWatch Developer Guide API, Create Alarms That or Terminate an Instance, Jan. 2013, downloaded Nov. 16, 2016 from archive.org., pp. 1-11.
Amazon RDS FAQs, Oct. 4, 2012, downloaded Nov. 16, 2016 from archive.org., 39 pp.
Bergsten et al., "Overview of Parallel Architectures for Databases," The Computer Journal vol. 36, No. 8, pp. 734-740 (1993).
Connectivity Testing with Ping, Telnet, Trace Route and NSlookup (hereafter help.webcontrolcenter), Article ID:1757, Created: Jun. 17, 2013 at 10:45 a.m., https://help.webcontrolcenter.com/kb/a1757/connectivity-testing-with-ping-telnet-trace-route-and-nslookup.aspx, 6 pages.

(56) References Cited

OTHER PUBLICATIONS

Dan et al., "Performance Comparisons of Buffer Coherency Policies," Proceedings of the International Conference on Distributed Computer Systems, IEEE Comp. Soc. Press vol. 11, pp. 208-217 (1991).
Decision to Grant dated Nov. 14, 2016 from Belarus Patent Application No. a20121441 with English Translation, 15 pp.
European Office Action in European Patent Application No. 16780794.0 dated Feb. 14, 2020, 6 pages.
Extended European Search Report for European Patent Application No. 16780794.0 mailed Sep. 19, 2018. 8 pages.
Extended European Search Report in European Patent Application No. 16804117.6 dated Nov. 2, 2018, 11 pages.
Extended European Search Report in European Patent Application No. 16804119.2 dated Dec. 4, 2018, 8 pages.
Extended European Search Report in European Patent Application No. 16812485.7 dated Dec. 11, 2018, 9 pages.
Final Office Action dated Apr. 12, 2018 for U.S. Appl. No. 14/726,200, 6 pages.
Final Office Action dated Apr. 27, 2018 for U.S. Appl. No. 14/688,396, 37 pages.
Final Office Action dated Dec. 13, 2016 from U.S. Appl. No. 14/247,364, 31 pp.
Final Office Action dated Feb. 9, 2018 from U.S. Appl. No. 14/744,546, 22 pages.
Final Office Action dated Nov. 24, 2017 from U.S. Appl. No. 14/215,401, 33 pages.
Final Office Action dated Nov. 3, 2016 from U.S. Appl. No. 14/215,401, 36 pp.
Final Office Action dated Nov. 7, 2017 from U.S. Appl. No. 14/247,364, 13 pages.
Final Office Action dated Sep. 9, 2016 from U.S. Appl. No. 14/215,461, 26 pp.
First Examination Report issued by the Canadian Intellectual Property Office for Application No. 2,793,429, dated Feb. 14, 2017, 3 pages.
Garding, P. "Alerting on Database Mirorring Events," Apr. 7, 2006, downloaded Dec. 6, 2016 from technet.microsoft. com, 24 pp.
Herlihy et al., "Transactional Memory: architectural support for lock-free data structures," In Proceedings of the 1993 International Symposium on Computer Architecture, May 1993, San Diego, CA, 12 pages.
Hull, Autoscaling MySQL on Amazon EC2, Apr. 9, 2012, 7 pages.
International Preliminary Report on Patentability dated Oct. 13, 2015 from PCT/US2014/033270, 4 pp.
International Search Report and Written Opinion dated Aug. 21, 2014 for PCT/US2014/033270, 5 pp.
International Search Report and Written Opinion dated Jul. 15, 2016 from PCT/US2016/27658, 37 pp.
International Search Report and Written Opinion dated Oct. 28, 2016 from PCT/US16/34651, 16 pp.
International Search Report and Written Opinion dated Sep. 8, 2016 from PCT/US16/37977, 11 pp.
International Search Report and Written Opinion dated Sep. 9, 2016 from PCT/US16/34646, 12 pp.
International Search Report dated Sep. 26, 2012 from PCT/US2011/029056, 4 pp.
Iqbal, A. M. et al., "Performance Tradeoffs in Static and Dynamic Load Balancing Strategies," Institute for Computer Applications in Science and Engineering, 1986, pp. 1-23.
Ladin et al., "Providing high availability using lazy replication," ACM Trans. Comput. Syst. (1992), 32 pages, DOI:10.1145/138873.138877Corpus ID: 2219840.
Leverenz et al., "Oracle8i Concepts, Partitioned Tables and Indexes," Chapter 11, pp. Nov. 12, 11/66 (1999).
Non-Final Office Action dated Apr. 12, 2017 from U.S. Appl. No. 14/247,364, 12 pp.
Non-Final Office Action dated Feb. 1, 2016 from U.S. Appl. No. 14/215,461, 19 pp.
Communication pursuant to Art 94(3) EPC dated Aug. 1, 2022 in European Application No. 16780794.0, 6 pages.
Examiner's Report dated Jan. 31, 2023 in Canadian Application No. 2987822, 6 pages.
Office Action with translation in Korean Application No. 10-2017-7033167 dated Mar. 23, 2023, 16 pages.
Snapshot (computer storage) Wikipedia, anonymous, Mar. 22, 2015, CP055939439, retrieved from the internet: URL: https://en.wikipedia.org/w/index.php?title=Snapshot_(computer_storagE[retrieved on Jul. 6, 2022], 5 pages.

* cited by examiner

Transaction Engine

- SQL Client Protocol
  202
- SQL Parser
  204
- Optimizer
  206
- Atom to SQL Mapping
  208
- Atom Cache
  210
- Operation Execution
  212
- Transaction Enforcement
  214
- Language-Neutral Peer Communication
  216

FIG. 2a

Storage Manager

- Language-Neutral Peer Communication
  216
- Atom Cache
  210
- Transaction Manager
  220
- Journal
  222
- Storage Interface
  224

FIG. 2b

DISCONNECTED OPERATION WITHIN DISTRIBUTED DATABASE SYSTEMS

CROSS REFERENCE TO RELATED APPLICATIONS

This application claims the benefit, under 35 U.S.C. § 120 as a continuation of U.S. patent application Ser. No. 16/213,695, filed Dec. 7, 2018, entitled "Disconnected Operation within Distributed Database Systems," which claims the benefit, under 35 U.S.C. § 120 as a continuation of U.S. patent application Ser. No. 14/726,200, filed May 29, 2015, entitled "Disconnected Operation within Distributed Database Systems," the disclosure of each of which is incorporated herein by reference in its entirety.

FIELD OF DISCLOSURE

The present disclosure relates generally to database systems, and more particularly to partially disconnected operation in distributed database systems.

BACKGROUND

Partially-disconnected operation (PDO), also referred to as disconnected operation, is a term of art for distributed systems that can continue to operate even when portions of the distributed system become isolated or partitioned from each other by network failures or interruptions. Partial refers to the limited capabilities of distributed systems while experiencing these network connectivity issues. During PDO, some operations get delayed or are prevented because they require system-wide consensus by all nodes of the distributed system before taking effect. For example, consider a distributed database system wherein each database node stores a full copy of the database. Clients "see" the database as a single, logical entity, although the database persists on multiple nodes. So, when a client connects to a first node and performs a write operation on the database, those changes propagate to all other database nodes. Consequently, clients connecting to other nodes within the distributed database system see a version of the database with those changes. In this way, queries to the database can be answered locally or by the closest node to the querying client. Network connectivity issues can interrupt these changes from propagating between the nodes and, as a result, can cause inconsistent database versions between nodes.

Thus write operations within a distributed database often have both local and global requirements. Local requirements include updating a node's own local copy of the database in accordance with the write operation. Global requirements, on the other hand, include updating each copy of the database stored on other nodes within the distributed database system such that the same database version (or state) persists amongst all database nodes. During PDO such write operations cannot propagate to all database nodes, and so they fail to satisfy the global requirements. For example, consider that nodes of a first group of database nodes can communicate with one another via a network, but become isolated from a second group of nodes because of a network failure such as a router malfunction. This scenario often occurs during network interruptions between two or more groups of nodes physically located in different geographic regions. For instance, if the first group of nodes is located in North America and the second group of nodes is located in Europe, such network interruptions prevent transactions committed by the first group of nodes from propagating to the second group of nodes, and vice-versa. So, to avoid having an inconsistent database version between the two groups of nodes, distributed database systems suspend all processing of transactions entirely, or at least have one group of nodes automatically stop processing transactions in response to determining presence of a network connectivity issue.

BRIEF DESCRIPTION OF THE DRAWINGS

FIG. 2a schematically illustrates the architecture of an example transaction engine that forms part of the distributed database system of FIG. 1, in accordance with an embodiment of the present disclosure.

FIG. 2b schematically illustrates the architecture of an example storage manager that forms part of the distributed database system of FIG. 1, in accordance with an embodiment of the present disclosure.

FIG. 8d is a block diagram illustrating one example superset atom after completion of the healing method of FIG. 8a.

Figure 1:
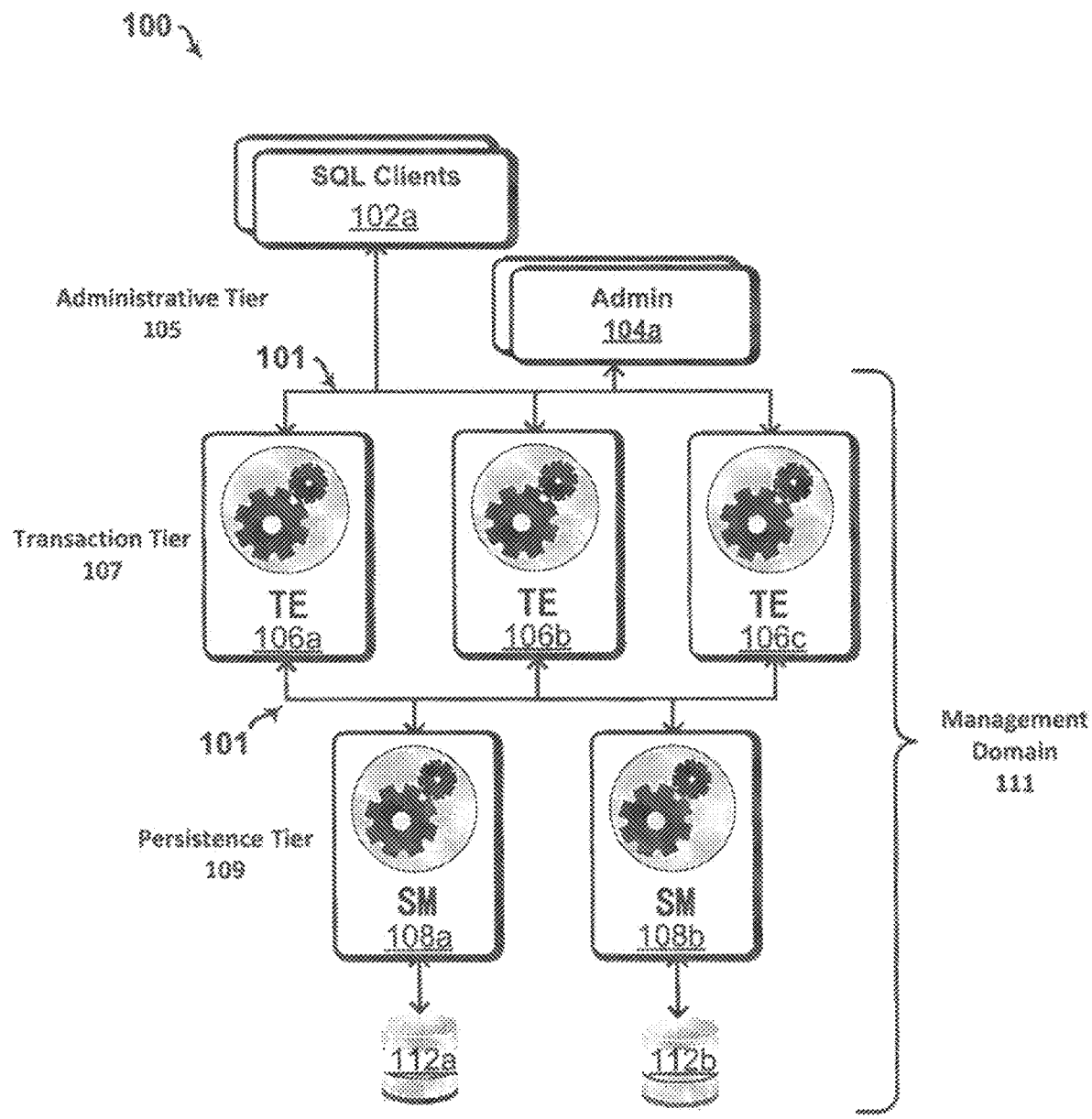
FIG. 1 schematically illustrates an example distributed database system that includes a plurality of interconnected nodes that are configured to implement a disconnected mode of operation, in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques are disclosed for disconnected operation in a distributed database system. In an embodiment, a distributed database system implements a disconnected mode of operation allowing isolated regions of database nodes to provisionally commit transactions, with the global requirements of those transactions later satisfied by a healing process after network connectivity is reestablished between the regions. In more detail, under partition due to some network failure mode, transactions executing within a given region behave normally, treating all the partition-visible state effectively as global state. These transactions are provisionally-committed. This means that their partition-local effects are visible as if they had committed, and information necessary for doing post-healing or so-called 'lazy' conflict detection and concurrency control is logged to durable storage. As long as the partition lasts, each partition acts as a separate distributed database. When the partition is healed, each partition's provisionally-committed transaction logs are reconciled. Reconciliation is a process of determining which transactions would have actually failed had the partition not occurred and aborting those particular transactions, and then applying the changes of the surviving transactions to all the partitions. This lazy conflict detection can be achieved with abstract locks, and consistency is maintained by using compensating actions. Thus, the healing process enables the distributed database system to construct a consistent global state of the database that accounts for the transactions provisionally-committed in each isolated region during the disconnected (partitioned) mode. Once the healing process completes, database clients "see" a healed version of the database that simulates or otherwise closely approximates a state of the database had the distributed database system performed the transactions during a normal, fully-connected, mode of operation.

General Overview

As previously discussed, distributed database systems prevent write operations having global requirements when operating in a disconnected mode to avoid inconsistent database versions between isolated regions of database nodes. Such approaches require database administrators to make a difficult decision: allow one region to continue accepting write operations to the exclusion of others, or disable write operations across all regions. In regard to allowing one region to continue accepting write operations to the exclusion of others, the distributed database system can predefine which region is a "master" region that continues to process write operations during PDO mode. This means that other regions stop processing write operations until network connectivity is restored. Once restored, the distributed database system brings those other regions to a normal operating state (e.g., to start accepting new write operations) by copying or otherwise accounting for the database updates that occurred in the master region. But, database clients that connect to the database via those other regions cannot execute write operations until such an accounting operation completes (clients of the non-master regions also won't "see" writes made to the master region until accounting is completed). In regard to disabling write operations across all regions, the distributed database system stops accepting new write operations altogether, and waits for network connectivity between regions to be restored before returning to a normal operating state. Administrators typically avoid this option in favor of at least one region continuing to accept write operations. So, the choice often becomes one of compromise and ultimately results in one or more regions suspending normal operation. This represents a substantial impediment to the implementation of a robust disconnected mode of operation in a distributed database.

Thus, in an embodiment according to the present disclosure, a distributed database system implements a disconnected mode of operation that enables each isolated region of database nodes to provisionally commit transactions, with the global requirements of those transactions later satisfied by a so-called "healing" process after network connectivity is restored. The healing process, in turn, enables the distributed database system to construct a consistent global state of the database that accounts for and reconciles the transactions provisionally-committed in each isolated region during the disconnected mode. Because transaction conflicts are reconciled after the healing process, the conflict detection process is referred to herein as lazy.

In an embodiment, the distributed database system can include two or more predefined regions, with each region including at least one database node. As generally referred to herein, a database node refers to a plurality of computer-readable instructions that when executed by at least one processor cause a database process to be carried out. To this end, a computer system can execute two such processes and thus host multiple co-located database nodes. Co-location is particularly advantageous when, for example, a node is responsible for determining network connectivity between regions, and also for communicating that determination to other database nodes on the same computer. In more detail, the collocation of database nodes or processes ensures that such communication occurs without interruption (or at least with a low probability of an interruption), and further that the node responsible for the network connectivity checks has the same vantage point or "point of view" of the network between regions as the other local database nodes. Co-location generally refers to two more processes (or nodes) that are executed on the same computer system by the same set of one or more processors.

Some such database nodes can include a transaction engine (TE) node responsible for servicing transactions received from database clients, and a storage manager (SM) node responsible for making database changes durable. In an embodiment, each database node includes a co-located admin node or process that is integrated with or otherwise in communication with the database node. The admin node or process, among other things, can detect network connectivity from the perspective of nodes with which it is associated or other partition-inducing issues occurring between its own region and other regions, and in response to detecting a partition, cause all database nodes within its particular region to enter a disconnected mode of operation. During the disconnected mode of operation, a TE node accepts database client connections and provisionally commits transactions received from those database clients. Transactions can include write operations having both local and global requirements, as well as any read operations. The TE node satisfies local requirements by updating its partition-local copy of the database, in accordance with a received transaction, and by broadcasting messages to other peer database nodes in its region to ensure that each peer node has a consistent partition-local copy of the database.

The TE node can also log a received transaction with one or more abstract locks to later satisfy global requirements when network connectivity is restored between regions. In general, an abstract lock is a parameterized data structure that is registered with provisionally-committed transactions. There are different types of locks, each configured to express some constraint that a given transaction was maintaining. In an embodiment, for instance, for each lock type, there is a defined overlapping predicate that determines when instances of a lock are referring to the same state. Each lock instance includes a context (e.g., schema, table, index or column set), a set of values to construct the instance, and a mode (e.g., Shared or Exclusive). Two locks are said to conflict if their contexts overlap, their instances overlap and their modes are mutually exclusive. For example, to maintain global uniqueness on column c1 in table t1, each transaction may grab a value lock on the value inserted. The context would be the table, or ideally the column. The value is just the new unique value being inserted, and the mode would be Exclusive to guarantee that it would conflict with any other locks on the same value. The overlap function for value locks is simple equality (the locks overlap if their values are equal). Therefore, any other provisionally-committed transaction in any other partition that attempted to INSERT or UPDATE the same value would have a registered abstract lock that would conflict with this transaction's abstract lock. In this way, all uniqueness violations that occurred during partition can be detected without having to scan the entire table. Thus, an abstract lock includes information identifying database objects, such as tables, and rows that represent records, and can prevent other transactions from manipulating those identified database objects in a destructive or otherwise corrupting manner. A given transaction can affect one or more records within one or more database tables. Thus a TE can create an abstract lock for an affected record based on, for example, an abstract lock policy associated with a database table responsible for storing that affected record. Abstract lock polices can define high-level rules that enable conflict determination during the healing process. More particularly, abstract locks enable two or more transactions to manipulate the same database object, but prevent any manipulation that violates a logical rule. One such rule could include, for example, not allowing two records in a particular table to have the same unique key. Recall that two or more isolated regions of the database can continue to process write operations during the disconnected mode. So, the distributed database system can utilize these abstract locks during the healing process to determine which provisionally-committed transactions from each region conflict, or do not conflict, as the case may be.

The TE node can also log a received transaction with a set of compensating actions. Compensating actions are additional operations that are run as the transaction transitions between provisionally-committed and other states. From provisionally-committed there are two successor states, aborted and healing. Aborted is selected if the transaction was found to be in conflict and was selected for sacrifice. Because this effective rollback is requested after the transaction had provisionally committed, the record versions that were installed by this transaction cannot be simply removed. Rather, the effects of this transaction have to be logically undone. Therefore, an abort compensating action can be executed. The abort action can be executed in the context of the partition that provisionally committed the transaction that is now to be aborted, and the effect of the abort action can be to logically undo the state changes that have now been discovered to be in conflict.

The remaining successor state is healing, which is the state a transaction transitions to when it will be committed, but its changes need to take effect on all the other partitions. For example, if a transaction incremented a counter using an update, this is an inherently commutative operation. However, each partition may have a different topmost record version for that record. The healing action would be to perform that increment on the other partitions. The final transition is from healing to committed, and this is a global state change. Compensating actions that fire when the transaction is finally globally committed are for performing operations that are inherently global or are irrevocable (cannot be aborted or retried). Thus, compensating actions can comprise an "on commit" or so-called healing action and an "on abort" or simply abort action. In a general sense, each compensating action is like a mini-transaction that seeks to logically abort or logically commit the provisional transaction that constructed it. In the context of the healing process discussed below, this means the distributed database system can detect conflicts based on abstract locks, and in response to determining a conflict, utilize the "on abort" action to remove all changes caused by a conflicting transaction (a logical abort against the partitioned state). Conversely, the distributed database system can utilize the "on commit" action to apply a non-conflicting transaction to construct a new global state for the database (e.g., via a logical commit against the new global state).

In an embodiment, the admin node can also detect when network connectivity is restored between its region and all other regions of the distributed database system, and as a result, can automatically execute a healing process. Alternatively, the admin node can manually execute the healing process based on, for example, user input. Recall that each region includes at least one database node, and all database nodes can have at least one co-located admin process. Thus the distributed database system can assign one database node to perform healing for all regions, with that node being generally referred to herein as a so-called "healing node." The healing node performs this healing process, in part, by requesting a transaction log from each region. Once received, the healing node can traverse each transaction log to determine conflicts between provisionally-committed transactions. For example, the healing node can alternate through each transaction log in a round-robin fashion (e.g., one transaction processed from each log, then repeat), but other approaches to the order of log processing will be apparent in light of this disclosure. The healing node analyzes each provisionally-committed transaction and, if no conflict is detected, commits a given transaction utilizing an "on commit" action. In addition, the healing node adds one or more abstract locks from each non-conflicting transaction to a collection of abstract locks. This collection is the set of locks associated with the new global state that the healing node constructs. In addition, the healing node sends replication messages to one or more regions of database nodes such that each database node therein updates their respective copy of the database in accordance with the transaction. Thus the healing node builds a new global state of the database that accounts for all non-conflicting transactions that occurred within each region during the disconnected mode. In the event of a conflict, the healing node performs an "on abort" action on conflicting transactions. In one embodiment, the on abort action causes all nodes within the region that provisionally-committed the transaction to remove the data manipulated by the transaction. As discussed below, the distributed database system can store multiple versions of each database object. To this end, the healing node executes the on abort action to logically remove the changes in the version of the database state associated with the partition in which the conflicting transaction was originally executed. The healing node executes the commit action to update the version of the database state being constructed to reflect the new post-healing global state. This version of database state can be replicated to all regions, however it remains logically visible to transactions within those regions until the healing process completes.

TE nodes within each region of database nodes can continue to provisionally commit transactions until the healing process completes. This means that a database client performing queries on a particular TE node during the disconnected mode "sees" a version of the database local to the TE node's region, with that version of the database representing the state of the database prior to network interruption and relative to provisionally-committed transactions. For example, if a TE node executes a transaction that modifies a record (e.g., creates a new version) within the database during a disconnected mode of operation, database clients utilizing that TE node (or another TE node in the same region) to perform queries will see that modified record within the database. Conversely, clients utilizing TE nodes in other regions to perform queries will not see that modified record, and instead, see a version of the database local to their respective region until the healing process completes. Once the healing process completes, the distributed database system can switch over to the new global state of the database such that database clients "see" the modified record (assuming the modification does not conflict) when performing queries using any TE node within the distributed database system.

Disconnected operation can be triggered after an admin node determines that a network failure occurred. To this end, a period of time between when the network failure occurred and its subsequent detection by the admin node can elapse. To handle a transaction that occurs within this period of time, a TE node executing a transaction can log enough information to provisionally commit that transaction in anticipation of a network failure. Thus if a network failure is detected that would otherwise prevent global agreement on the state or effect of the transaction, that transaction can be provisionally committed. This log will grow with the number of transactions. However a transaction, once it is replicated to all nodes in the database, is no longer in danger of needing to be healed, and can therefore have its provisional information deleted from the log. Various embodiments disclosed herein can use this safety property to drive a garbage collection scheme to clean up the log in the background. In an embodiment, the distributed database can include storage sufficient to log transactions states indefinitely. Note the particular choice of garbage collection schemes is not particularly relevant to the present disclosure and numerous implementations will be apparent in light of this disclosure.

A number of advantages are associated with certain aspects of the disclosed embodiments. For example, an embodiment enables the distributed database system to allow write operations to continue within each region of database nodes even during a disconnected mode of operation. For instance, database clients can connect to TE nodes within a given region and perform normal operations on the database such as write and read operations. So, database clients do not necessarily need to enter an off-line mode or otherwise suspend operation during the disconnected mode of operation because a TE node provisionally commits transactions in a manner that is transparent to the client. The distributed database system can later reconcile all provisionally-committed transactions during a healing process, once network connectivity is restored, such that all provisionally-committed transactions are accounted for in a new global state of the database. So, the distributed database system can provide, in a sense, full and uninterrupted operation during the disconnected mode of operation and later resolve conflicts between transactions in a manner that is transparent to the database clients. Thus, the clients "see" a healed version of the database that simulates or otherwise closely approximates a state of the database had the transactions been performed during normal operation of the distributed database (e.g., all regions of nodes accessible via a network).

Architecture and Operation

FIG. 1 illustrates an example distributed database system 100 comprising interconnected nodes configured to implement a disconnected mode of operation, in accordance with an embodiment of the present disclosure. As shown in the example embodiment, the architecture of the distributed database system 100 includes a number of database nodes assigned to three logical tiers: an administrative tier 105, a transaction tier 107, and a persistence tier 109. The nodes comprising the distributed database system 100 are peer nodes that can communicate directly and securely with each other to coordinate ongoing database operations. So, as long as at least one database node is operational within each of the transaction tier 107 and the persistence tier 109, structured query language (SQL) clients 102a can connect and perform transactions against databases hosted within the distributed database system 100.

In more detail, the distributed database system 100 is an elastically-scalable database system comprising an arbitrary number of database nodes (e.g., nodes 104a, 106a-106c, 108a-b) executed on an arbitrary number of host computers (not shown). For example, database nodes can be added and removed at any point on-the-fly, with the distributed database system 100 using newly added nodes to "scale out" or otherwise increase database performance and transactional throughput. As will be appreciated in light of this disclosure, the distributed database system 100 departs from database approaches that tightly couple on-disk representations of data (e.g., pages) with in-memory structures. Instead, certain embodiments disclosed herein advantageously provide a memory-centric database wherein each peer node implements a memory cache in volatile memory (e.g., random-access memory) that can be utilized to keep active portions of the database cached for efficient updates during ongoing transactions. In addition, database nodes of the persistence tier 109 can implement storage interfaces that can commit those in-memory updates to physical storage devices to make those changes durable (e.g., such that they survive reboots, power loss, application crashes). Such a combination of distributed memory caches and durable storage interfaces is generally referred to herein as a durable distributed cache (DDC).

In an embodiment, database nodes can request portions of the database residing in a peer node's cache memory, if available, to avoid the expense of disk reads to retrieve portions of the database from durable storage. Examples of durable storage that can be used in this regard include a hard drive, a network attached storage device (NAS), a redundant array of independent disks (RAID), and any other suitable storage device. As will be appreciated in light of this disclosure, the distributed database system 100 enables the SQL clients 102a to view what appears to be a single, logical database with no single point of failure, and perform transactions that advantageously keep in-use portions of the database in cache memory (e.g., volatile random-access-memory (RAM)) while providing Atomicity, Consistency, Isolation and Durability (ACID) properties.

The SQL clients 102a can be implemented as, for example, any application or process that is configured to construct and execute SQL queries. For instance, the SQL clients 102a can be user applications implementing various database drivers and/or adapters including, for example, java database connectivity (JDBC), open source database connectivity (ODBC), PHP data objects (PDO), or any other database driver that is configured to communicate and utilize data from a relational database. As discussed above, the SQL clients 102a can view the distributed database system 100 as a single, logical database. To this end, the SQL clients 102a address what appears to be a single database host (e.g., utilizing a single hostname or internet protocol (IP) address), without regard for how many database nodes comprise the distributed database system 100.

Within the transaction tier 107 a plurality of TE nodes 106a-106c is shown. The transaction tier 107 can comprise more or fewer TE nodes, depending on the application, and the number shown should not be viewed as limiting the present disclosure. As discussed further below, each TE node can accept SQL client connections from the SQL clients 102a and concurrently perform transactions against the database within the distributed database system 100. In principle, the SQL clients 102a can access any of the TE nodes to perform database queries and transactions. However, and as discussed below, the SQL clients 102a can advantageously select those TE nodes that provide a low-latency connection through an agent node running as a "connection broker", as will be described in turn.

Within the persistence tier 109 a SM nodes 108a and 108b are shown. In an embodiment, each of the SM nodes 108a and 108b include a full archive of the database within a durable storage location 112a and 112b, respectively. In an embodiment, the durable storage locations 112a and 112b can be local (e.g., within the same host computer) to the SM nodes 108a and 108b. For example, the durable storage locations 112a and 112b can be implemented as a physical storage device such as a spinning hard drive, solid-state hard drive, or a raid array comprising a plurality of physical storage devices. In other cases, the durable storage locations 112a and 112b can be implemented as, for example, network locations (e.g., network-attached storage (NAS)) or other suitable remote storage devices and/or appliances, as will be apparent in light of this disclosure.

In an embodiment, each database node (admin node 104a, TE nodes 106a-106c, SM nodes 108a-b) of the distributed database system 100 can comprise a computer program product including machine-readable instructions compiled from C, C++, Java, Python or other suitable programming languages. These instructions may be stored on a non-transitory computer-readable medium, such as in a memory of a given host computer, and when executed cause a given database node instance to be instantiated and executed. As discussed below, an admin node 104a can cause such instantiation and execution of database nodes by causing a processor to execute instructions corresponding to a given database node. One such computing system 1100 capable of instantiating and executing database nodes of the distributed database system 100 is discussed below with regard to FIG. 9.

In an embodiment, the database nodes of each of the administrative tier 105, the transaction tier 107, and the persistence tier 109 are communicatively coupled through one or more communication networks 101. In an embodiment, such communication networks 101 can be implemented as, for example, a physical or wireless communication network that enables data exchanges (e.g., packets) between two points (e.g., nodes running on a host computer) utilizing one or more data transport protocols. Some such example protocols include transmission control protocol (TCP), user datagram protocol (UDP), shared memory, pipes or any other suitable communication means that will be apparent in light of this disclosure. In some cases, the SQL clients 102a access the various database nodes of the distributed database system 100 through a wide area network (WAN) facing IP address. In addition, as each database node within the distributed database system 100 could be located virtually anywhere where there is network connectivity, and encrypted point-to-point connections (e.g., virtual private network (VPN)) or other suitable secure connection types may be established between database nodes.

Management Domains and Regions

As shown, the administrative tier 105 includes at least one admin node 104a that is configured to manage database configurations, and is executed on computer systems that will host database resources. Thus, and in accordance with an embodiment, the execution of an admin node 104a is a provisioning step that both makes the host computer available to run database nodes, and makes the host computer visible to distributed database system 100. A collection of these provisioned host computers is generally referred to herein as a management domain. Each management domain is a logical boundary that defines a pool of resources available to run databases, and contains permissions for users to manage or otherwise access those database resources. For instance, and as shown in FIG. 1, the distributed database system 100 includes one such management domain 111 that encompasses the database nodes of the distributed database system 100, and the one or more respective host computers (not shown) executing those database nodes.

Figure 4:
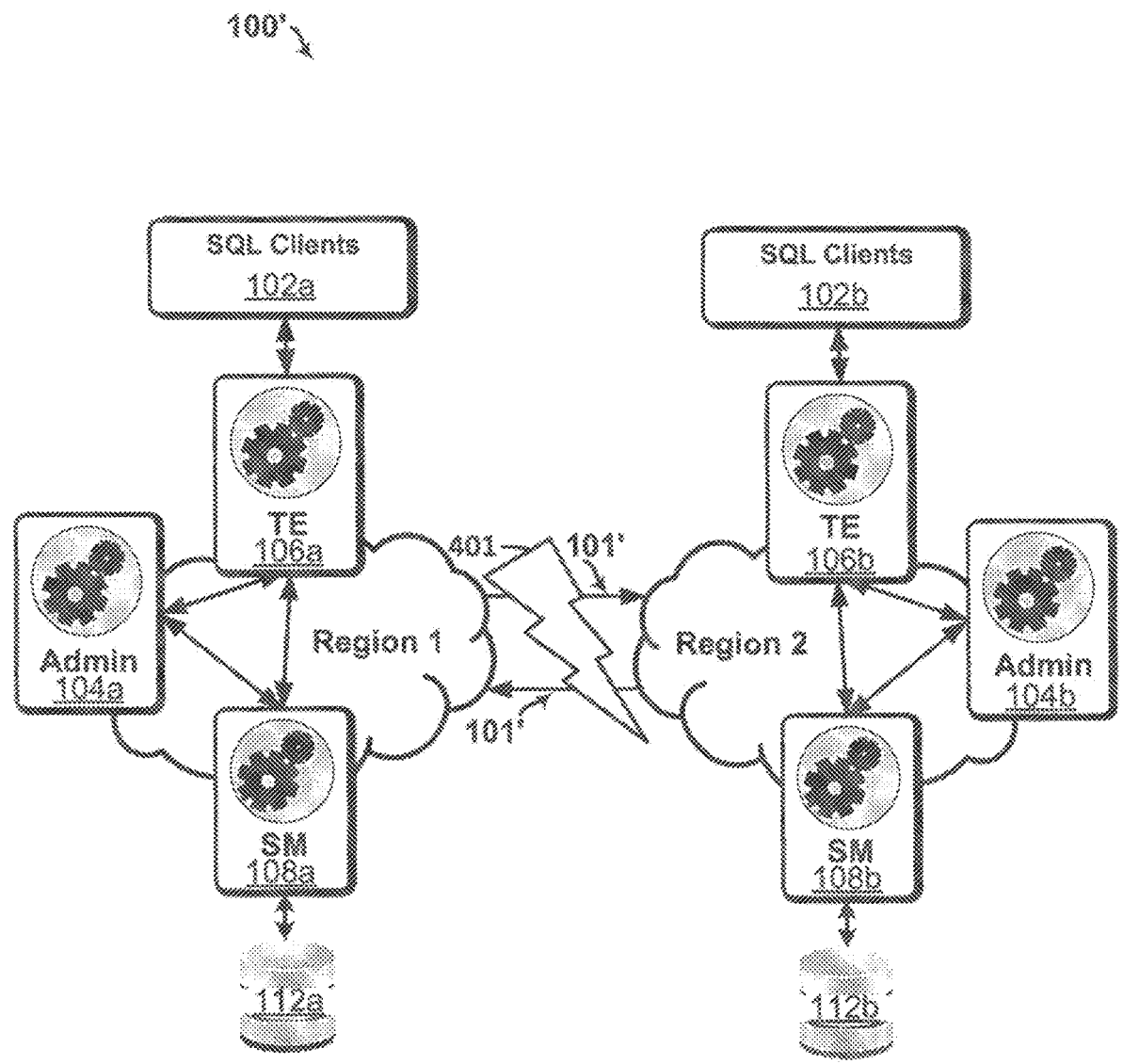
FIG. 4 schematically illustrates an example distributed database system including a first and second region of database nodes, in accordance with an embodiment of the present disclosure.

The distributed database system 100 can associate a number of database nodes within the management domain 111 with predefined regions, such as the example regions shown in FIG. 4. The term "region," as generally referred to herein, refers to a group of database nodes that have physical proximity to each other relative to other database nodes. Within the distributed database system 100, regions are persisted as data objects that include references to associated database nodes. The distributed database system 100 stores such region data objects in durable storage, although other storage locations (e.g., a flat-file) could be utilized. As discussed below with regard to FIG. 4, each region includes at least one admin node that monitors network connectivity between its respective region and other regions, and controls various processes related to the disconnected mode of operation.

In an embodiment, a user can execute a command to create a region through, for example, a user interface (UI) hosted by the admin node 104a. In addition, a user can execute a command to manually associate a database node with that newly created region. In other embodiments, the distributed database system 100 can automatically identify locations of each node through, for example, each database node having a GPS coordinate, a particular Internet Protocol (IP) address scheme that identifies a physical location, or other location identifier as will be appreciated in light of this disclosure. In these embodiments, the distributed database system 100 can automatically associate a database node with a particular region based on its location, or suggest an association based on its location to a user, depending on a desired configuration.

For a given management domain, an admin node 104*a* running on each of the host computers is responsible for starting and stopping a database, monitoring those nodes and the host's computers resources, and performing other host-local tasks. In addition, each admin node 104*a* enables new database nodes to be executed to, for example, increase transaction throughput and/or to increase the number of storage locations available within the distributed database system 100. This enables the distributed database system 100 to be highly elastic as new host computers and/or database nodes can be added in an on-demand manner to meet changing database demands and decrease latencies. For example, database nodes can be added and executed on-the-fly during runtime (e.g., during ongoing database operations), and those database nodes can automatically authenticate with their peer nodes in order to perform secure point-to-point communication within the management domain 111.

A management domain can have any number of such admin nodes 104*a* based on factors such as, for example, the number of host computers within that management domain. A region can have multiple admin nodes; however, only one admin node in each region is necessary to perform network connectivity checks with other regions. The admin node 104*a* performing the network connectivity check is generally referred to herein as a master admin node. Such network connectivity checks can include, for example, pinging one or more database nodes (or host computers) in other regions to determine network availability. In other examples, each database node within the master admin node's region can ping one or more nodes in other regions and report ping failures/success to the master admin node. In the event one master admin node fails (e.g., due to a hardware problem, reboot, power cycle), another admin node 104*a* within the same region can take over the network connectivity checks. This hand-off of responsibilities can be based on the admin nodes within a particular region agreeing to designate a new master admin node (e.g., through voting).

In an embodiment, the admin node 104*a* can be further configured to operate as a connection broker. The connection broker role enables a global view of all admin nodes in a management domain, and thus all database nodes, databases and events (e.g., diagnostic, error related, informational) therein. In addition, the connection broker role enables load-balancing between the SQL clients 102*a* and the TE nodes 106*a*-106*c*. For example, the SQL clients 102*a* can connect to a particular admin node configured as a connection broker in order to receive an identifier of a TE node (e.g., an IP address, host name, alias, or logical identifier) that can service connections and execute transactions with a relatively low latency compared to other TE nodes. In an embodiment, load-balancing policies are configurable, and can be utilized to optimize connectivity based on factors such as, for example, resource utilization and/or locality (e.g., with a preference for those TE nodes geographically closest to a SQL client, or those TE nodes with the fastest response time).

Transaction Engine Architecture

FIG. 2*a* depicts one example of the architecture 200 of the TE nodes (e.g., TE nodes 106*a*-106*c*) within the distributed database system 100, in accordance with an embodiment of the present disclosure. As discussed above, TE nodes are client-facing database nodes that accept connections from the SQL clients 102*a* and enable a single, logical view of a database across a plurality of database nodes within the management domain 111. Accordingly, and as shown, the TE architecture 200 includes a SQL client protocol module 202. In an embodiment, the SQL client protocol module 202 can be configured to host remote connections (e.g., through UDP/TCP) and receive packets (or data structures via shared memory/pipes) from SQL clients 102*a* to execute SQL transactions. The SQL parser module 204 is configured to receive the SQL transactions from the remote connections, and parses those queries to perform various functions including, for example, validating syntax and semantics validation, determining whether adequate permissions exist to execute the statements, and allocating memory and other resources dedicated to the query. In some cases, a transaction can comprise a single operation such as "SELECT," "UPDATE," "INSERT," and "DELETE," just to name a few. In other cases, each transaction can comprise a number of such operations affecting multiple objects within a database. In these cases, and as will be discussed further below, the distributed database system 100 enables a coordinated approach that ensures these transactions are consistent and do not result in errors or other corruption that can otherwise be caused by concurrent transactions updating the same portions of a database (e.g., performing writes on a same record or other database object simultaneously).

In an embodiment, an optimizer 206 can be configured to determine a preferred way of executing a given query. To this end, the optimizer 206 can utilize indexes, clusters, and table relationships to avoid expensive full-table scans and to utilize portions of the database within cache memory when possible.

As shown, the example TE architecture 200 includes an atom to SQL mapping module 208. The atom to SQL mapping module 208 can be utilized to locate atoms that correspond to portions of the database that are relevant or otherwise affected by a particular transaction being performed. As generally referred to herein, the term "atom" refers to a flexible data object or structure that contains a current version and a number of historical versions for a particular type of database object (e.g., schema, tables, rows, data, blobs, and indexes). Within TE nodes, atoms generally exist in non-persistent memory, such as in an atom cache module, and can be serialized and de-serialized, as appropriate, to facilitate communication of the same between database nodes. As will be discussed further below with regard to FIG. 2*b*, atom updates can be committed to durable storage by SM nodes. So, atoms can be marshalled or un-marshaled by SMs utilizing durable storage to service requests for those atoms by TEs nodes.

It should be appreciated in light of this disclosure an atom is a chunk of data that can represent a database object, but is operationally distinct from a conventional page in a relational database. For example, atoms are, in a sense, peers within the distributed database system 100 and can coordinate between their instances in each atom cache 210, and during marshalling or un-marshalling by the storage interface 224. In addition to database objects, there are also atoms that represent catalogs, in an embodiment. In this embodiment, a catalog can be utilized by the distributed database system 100 to resolve atoms. In a general sense, catalogs operate as a distributed and self-bootstrapping lookup service. Thus, when a TE node starts up, it needs to get just one atom, generally referred to herein as a catalog. This is a root atom from which all other atoms can be found. Atoms link to other atoms, and form chains or associations that can be used to reconstruct database objects stored in one or more atoms. For example, the root atom can be utilized to reconstruct a table for query purposes by locating a particular table atom. In turn, a table atom can reference other related atoms such as, for example, index atoms, record atoms, and data atoms.

In an embodiment, a TE node is responsible for mapping SQL content to corresponding atoms. As generally referred to herein, SQL content comprises database objects such as, for example, tables, indexes and records that may be represented within atoms. In this embodiment, a catalog may be utilized to locate the atoms which are needed to perform a given transaction within the distributed database system 100. Likewise, the optimizer 206 can also utilize such mapping to determine atoms that may be immediately available in the atom cache 210.

Although TE nodes are described herein as comprising SQL-specific modules 202-208, such modules can be understood as plug-and-play translation layers that can be replaced with other non-SQL modules having a different dialect or programming language. As will be appreciated in light of this disclosure, ACID properties are enforced at the atom-level, which enables the distributed database system to execute other non-SQL type concurrent data manipulations while still providing ACID properties.

Continuing with FIG. 2a, the TE architecture 200 includes an atom cache 210. As discussed above with regard to FIG. 1, the atom cache 210 is part of the DDC implemented within the distributed database system 100. To this end, and in accordance with an embodiment of the present disclosure, the atom cache 210 hosts a private memory space in RAM accessible by a given TE node. The size of the atom cache can be user-configurable, or sized to utilize all available memory space on a host computer, depending upon a desired configuration. When a TE first executes, the atom cache 210 is populated with one or more atoms representing a catalog. In an embodiment, the TE utilizes this catalog to satisfy executed transactions, and in particular, to identify and request the atoms within the atom cache 210 of other peer nodes (including peer TEs and SMs). If an atom is unavailable in any atom cache, a request can be sent to an SM within the distributed database system 100 to retrieve the atom from durable storage, and thus make the requested atom available within the atom cache of the SM. So, it should be appreciated in light of this disclosure that the atom cache 210 is an on-demand cache, wherein atoms can be copied from one atom cache to another, as needed. It should be further appreciated that the on-demand nature of the atom cache 210 enables various performance enhancements as a given TE node can quickly and efficiently be brought on-line without the necessity of retrieving a large number of atoms.

Still continuing with FIG. 2a, the TE architecture 200 includes an operation execution module 212. The operation execution module 212 can be utilized to perform in-memory updates to atoms (e.g., data manipulations) within the atom cache 210 based on a given transaction. Once the operation execution module 212 has performed various in-memory updates to atoms, a transaction enforcement module 214 ensures that changes occurring within the context of a given transaction are performed in a manner that provides ACID properties. As discussed above, concurrently-executed transactions can potentially alter the same portions of a database during execution. By way of illustration, consider the sequence of events that occur when money is moved between bank accounts represented by tables and data in a database. During one such example transaction, a subtraction operation decrements money from one record in the database and then adds the amount decremented to another record. This example transaction is then finalized by a commit operation that makes those record changes "durable" or otherwise permanent (e.g., in hard drive or other non-volatile storage area). Now consider if two such transactions are concurrently performed that manipulate data in same portions of the database. Without careful consideration of this circumstance, each transaction could fail before fully completing, or otherwise cause an inconsistency within the database (e.g., money subtracted from one account but not credited to another, incorrect amount debited or added to an account, and other unexpected and undesirable outcomes). This is so because one transaction could alter or otherwise manipulate data causing the other transaction to "see" an invalid or intermediate state of that data. To avoid such isolation and consistency violations in the face of concurrent transactions, and in accordance with an embodiment of the present disclosure, the distributed database system 100 applies ACID properties. These properties can be applied not at a table or row level, but at an atom-level. To this end, concurrency is addressed in a generic way without the distributed database system 100 having specific knowledge that atoms contain SQL structures. Application of the ACID properties within the context of the distributed database system 100 will now be discussed in turn.

Atomicity refers to transactions being completed in a so-called "all or nothing" manner such that if a transaction fails, a database state is left unchanged. Consequently, transactions are indivisible ("atomic") and fully complete, or fully fail, but never perform partially. This is important in the context of the distributed database system 100, where a transaction not only affects atoms within the atom cache of a given TE node processing the transaction, but all database nodes having a copy of those atoms as well. As will be discussed below, changes to atoms can be communicated in an asynchronous manner to each database process, with those nodes finalizing updates to their respective atom copies only after the transaction enforcement module 214 of the TE node processing the transaction broadcasts a commit message to all interested database nodes. This also provides consistency, since only valid data is committed to the database when atom updates are finally committed. In addition, isolation is achieved as concurrently executed transactions do not "see" versions of data that are incomplete or otherwise in an intermediate state of change. As discussed further below, durability is provided by SM database nodes, which also receive atom updates during transaction processing by TEs, and finalize those updates to durable storage (e.g., by serializing atoms to a physical storage location) before acknowledging a commit. In accordance with an embodiment, an SM may journal changes before acknowledging a commit, and then serialize atoms to durable storage periodically in batches (e.g., utilizing lazy-write).

Figure 3:
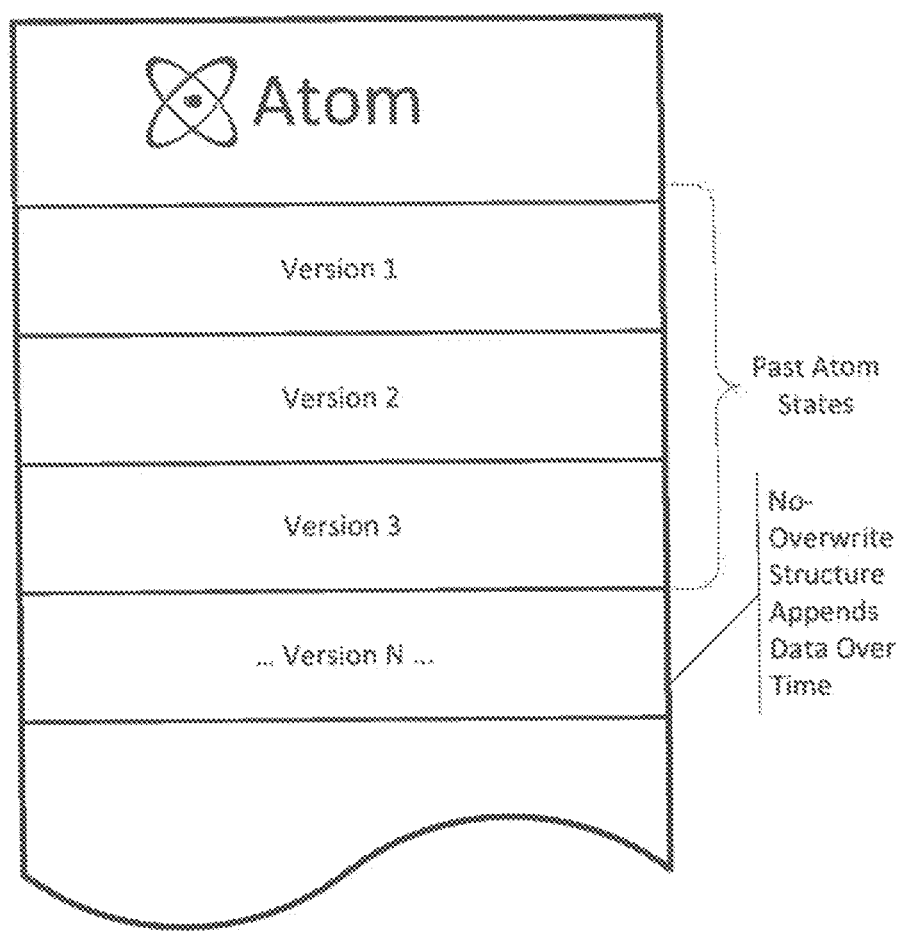
FIG. 3 is a block diagram illustrating an example atom having a no-overwrite structure, in accordance with an embodiment of the present disclosure.

To comply with ACID properties, and to mitigate undesirable delays due to locks during write operations, the transaction enforcement module 214 can be configured to utilize multi-version concurrency control (MVCC). In an embodiment, the transaction enforcement module 214 implements MVCC by allowing several versions of data to exist in a given database simultaneously. Therefore, an atom cache (and durable storage) can hold multiple versions of database data and metadata used to service ongoing queries to which different versions of data are simultaneously visible. In particular, and with reference to the example atom structure shown in FIG. 3, atoms are objects that can contain a canonical (current) version and a predefined number of pending or otherwise historical versions that may be used by current transactions. To this end, atom versioning is accomplished with respect to versions of data within atoms, and not atoms themselves. Note, a version is considered pending until a corresponding transaction successfully commits. So, the structure and function of atoms enable separate versions to be held in-cache so that no changes occur in-place (e.g., in durable storage); rather, updates can be communicated in a so-called "optimistic" manner as a rollback can be performed by dropping a pending update from an atom cache. In an embodiment, the updates to all interested database nodes that have a copy of the same atom in their respective atom cache (or durable storage) can be communicated asynchronously (e.g., via a communication network), and thus, allowing a transaction to proceed with the assumption that a transaction will commit successfully.

Continuing with FIG. 2a, the example TE architecture 200 includes a language-neutral peer communication module 216. In an embodiment, the language-neutral peer communication module 216 is configured to send and receive low-level messages amongst peer nodes within the distributed database system 100. These messages are responsible for, among other things, requesting atoms, broadcasting replication messages, committing transactions, and other database-related messages. As generally referred to herein, language-neutral denotes a generic textual or binary-based protocol that can be utilized between database nodes that is not necessarily SQL. To this end, while the SQL client protocol module 202 is configured to receive SQL-based messages via communication network 101, the protocol utilized between admin nodes, TE nodes, and SM nodes using the communication network 101 can be a different protocol and format, as will be apparent in light of this disclosure.

Storage Manager Architecture

FIG. 2b depicts one example of the architecture 201 of the SMs (e.g., SM node 108a and 108b) within the distributed database system 100, in accordance with an embodiment of the present disclosure. Each SM node is configured to address its own full archive of a database within the distributed database system 100. As discussed above, each database within the distributed database system 100 persists essentially as a plurality of atom objects (e.g., versus pages or other memory-aligned structures). Thus, to adhere to ACID properties, SM nodes can store atom updates to durable storage once transactions are committed. ACID calls for durability of data such that once a transaction has been committed, that data permanently persists in durable storage until otherwise affirmatively removed. To this end, the SM nodes receive atom updates from TE nodes (e.g., TE nodes 106a-106c) performing transactions, and commit those transactions in a manner that utilizes, for example, MVCC as discussed above with regard to FIG. 2a. So, as will be apparent in light of this disclosure, SM nodes function similarly to TEs as they can perform in-memory updates of atoms within their respective local atom caches; however, SM nodes eventually write such modified atoms to durable storage. In addition, each SM node can be configured to receive and service atom request messages from peer database nodes within the distributed database system 100.

In some cases, atom requests can be serviced by returning requested atoms from the atom cache of an SM node. However, and in accordance with an embodiment, a requested atom may not be available in a given SM node's atom cache. Such circumstances are generally referred to herein as "misses" as there is a slight performance penalty because durable storage must be accessed by an SM node to retrieve those atoms, load them into the local atom cache, and provide those atoms to the database node requesting those atoms. For example, a miss can be experienced by a TE node or SM node when it attempts to access an atom in its respective cache and that atom is not present. In this example, a TE node responds to a miss by requesting that missing atom from another peer node (e.g., TE node or SM node). In contrast, an SM node responds to a miss by requesting that missing atom from another peer node (e.g., a TE node or an SM node), or by loading that missing atom from durable storage if no peer nodes have the atom cached in their respective atom cache. To this end, a database node incurs some performance penalty for a miss. Note that in some cases there may be two misses. For instance, a TE node may miss and request an atom from an SM node, and in turn, the SM node may miss (e.g., the requested atom is not in the SM node's atom cache) and load the requested atom from disk.

As shown, the example SM architecture 201 includes modules that are similar to those described above with regard to the example TE architecture 200 of FIG. 2a (e.g., the language-neutral peer communication module 216, and the atom cache 210). It should be appreciated that these shared modules are adaptable to the needs and requirements of the particular logical tier to which a node belongs, and thus, can be utilized in a generic or so-called "plug-and-play" fashion by both transactional (e.g., TE nodes) and persistence-related database nodes (e.g., SM nodes). However, and in accordance with the shown embodiment, the example SM architecture also includes additional persistence-centric modules including a transaction manager module 220, a journal module 222, and a storage interface 224. Each of these persistence-centric modules will now be discussed in turn.

As discussed above, a SM node is responsible for addressing a full archive of one or more databases within the distributed database system 100. To this end, the SM node receives atom updates during transactions occurring on one or more TE nodes (e.g., TE nodes 106a-106c) and is tasked with ensuring that the updates in a commit are made durable prior to acknowledging that commit to a TE node, assuming that transaction successfully completes. As all database-related data is represented by atoms, so too are transactions within the distributed database system 100, in accordance with an embodiment. To this end, the transaction manager module 220 can store transaction atoms within durable storage. As will be appreciated, this enables SM nodes to logically store multiple versions of data-related atoms (e.g., record atoms, data atoms, blob atoms) and perform so-called "visibility" routines to determine the current version of data that is visible within a particular atom, and consequently, an overall current database state that is visible to a transaction performed on a TE node. In addition, and in accordance with an embodiment, the journal module 222 enables atom updates to be journaled to enforce durability of the SM node. The journal module 222 can be implemented as an append-only set of diffs that enable changes to be written efficiently to the journal.

As shown, the example SM architecture 201 also includes a storage interface module 224. The storage interface module 224 enables a SM node to write and read from durable storage that is either local or remote to the SM node. While the exact type of durable storage (e.g., local hard drive, RAID, NAS storage, cloud storage) is not particularly relevant to this disclosure, it should be appreciated that each SM node within the distributed database system 100 can utilize a different storage service. For instance, a first SM node can utilize, for example, a remote Amazon Elastic Block Store (EBS) volume while a second SM node can utilize, for example, an Amazon S3 service. Thus, such mixed-mode storage can provide two or more storage locations with one favoring performance over durability, and vice-versa. To this end, and in accordance with an embodiment, TE nodes and SM nodes can run cost functions to track responsiveness of their peer nodes. In this embodiment, when a node needs an atom from durable storage (e.g., due to a "miss") the latencies related to durable storage access can be one of the factors when determining which SM node to utilize to service a request.

In some embodiments the persistence tier 109 includes a snapshot storage manager (SSM) node that is configured to capture and store logical snapshots of the database in durable memory. In some example embodiments, the SSM node is implemented as described in U.S. patent application Ser. No. 14/688,396, filed Apr. 15, 2015 and titled "Backup and Restore in a Distributed Database Utilizing Consistent Database Snapshots" which is herein incorporated by reference in its entirety.

Now referring to FIG. 4, a block diagram depicts on example embodiment 100' of the distributed database system 100 of FIG. 1 configured with multiple predefined regions. As shown, Region 1 includes a subset of database nodes of the distributed database system 100 including an admin node 104a, a TE node 106a and an SM node 108a. SQL clients 102a represent database clients connecting locally to those database nodes in Region 1 and can execute transactions that perform read and write operations on the database. Region 2 also includes a subset of database nodes of the distributed database system including an admin node 104b, a TE node 106b and a SM node 108b. SQL clients 102b represent database clients connecting locally to those database nodes in Region 2 and can also execute transactions that perform read and write operations on the database. Although a particular number of regions is shown with each having a particular composition of database nodes, this disclosure should not be construed as limited in this regard. For example, the distributed database system 100 can include additional regions. Likewise, each region can include any number of database nodes and database node types. In general, each region includes at least one SM node and at least one TE node, although a region could include just an SM node. Such an SM-only configuration enables a region to serve as a backup-only region for the purpose of geo-redundancy. In any event, each region includes at least one admin node that monitors network connectivity between regions and causes database nodes in their respective regions to enter and exit the disconnected mode of operation.

During normal operation of the distributed database system 100, a TE node can perform a transaction on behalf of a database client to perform write and read operations on the database. The TE node replicates changes to other nodes within the distributed database system 100 such that each database node has an identical copy of a database. Recall that TE nodes do not necessarily retain a fully copy of the database; rather, TE nodes keep an active portion of the database in their respective atom cache to service transactions. So, a TE node receives a replication message if that TE node includes a portion of the database in its atom cache affected by the performance of a particular transaction. On the other hand, SM nodes receive all replication messages as they are responsible for making changes to the database durable. So, during normal operation all database nodes include an identical copy of the database, or portions thereof.

Within the example embodiment of FIG. 4, replication messages are communicated between Region 1 and Region 2 to ensure that TE nodes provide a single, logical view of the database regardless of which region a database query is performed. For example, SQL clients 102a can connect to the TE node 106a and execute transactions that manipulate the database. In response, the TE node 106a first performs such manipulations in-memory on atoms that represent database objects. In addition, the TE node 106a can replicate those atom changes to all other database nodes including local nodes within Region 1 and remote nodes within Region 2. Transactions performed on behalf of the SQL clients 102b by the TE node 106b get replicated to Region 1 in a similar manner. Communication network 101' illustrates network connectivity between Region 1 and 2 enabling replication to occur contemporaneously with the performance of transactions.

Note that the distributed database system 100 can also divide tables into table partitions and implement rules, also referred to as partitioning policies, which govern which subset of SM and SSM nodes store and service a particular table partition. In addition, the partitioning policies define criteria that determine which table partition a record is stored. So, the distributed database system may synchronize some database changes in a manner that directs or otherwise targets updates to a specific subset of database nodes when such partitioning policies are in effect. In some example embodiments, such table partitioning is implemented as described in co-pending U.S. patent application Ser. No. 14/725,916, filed May 29, 2015 and titled "Table Partitioning within Distributed Database Systems" which is herein incorporated by reference in its entirety. The example aspects and embodiments disclosed herein assume that the distributed database system 100 does not have active table partitioning policies.

In an embodiment, admin node 104a and 104b monitor network connectivity between their respective regions and other regions. For example, admin node 104a can periodically perform a ping operation that targets, for example, an IP address of at least one node within Region 2. In some cases this includes sending a ping message to the host computer that hosts admin node 104b in Region 2. However, other nodes can also perform network connectivity checks. For example, TE nodes can perform a ping operation, and in the event a ping fails, report that failure to an admin node in their particular region. Other methods of establishing network connectivity between regions could be utilized and this disclosure should not be limited in this regard. For example, a user datagram packet (UDP) could be broadcast to a particular region (e.g., based on a subnet), or directed to each database node within a particular region, or both. In another example, a routing device within each of Region 1 and 2 can detect network connectivity issues between Regions and send an alert message to a respective admin node.

In any event, the admin nodes 104a and 104b can perform network connectivity checks to determine the status of the communication network 101'. When the admin nodes 104a and 104b detect a network anomaly, such as a router misconfiguration or other network failure, the admin nodes 104a and 104b can cause nodes within their respective regions to enter a disconnected mode of operation. One such network interruption 401 is depicted in FIG. 4. In an embodiment, the admin nodes 104a and 104b broadcast a message to TE nodes within their respective regions to cause those TE nodes to enter a disconnected mode of operation, and to sever connections with all nodes in the other region(s).

During the disconnected mode of operation, a TE node provisionally commits transactions such that each database node within its respective region updates their copy of the database. While this satisfies local requirements of a transaction, the distributed database system 100 must ensure global requirements get later resolved after network connectivity is restored. For example, because Region 1 and Region 2 operate essentially as autonomous databases during the disconnected mode of operation, each region could provisionally commit a conflicting transaction. Consider a first transaction provisionally-committed in Region 1 that conflicts with a second transaction provisionally-committed in Region 2. One such example conflict includes deleting a record during the first transaction and attempting to update that record during the second transaction. So, to avoid such circumstances, the TE logs each provisional commit with one or more abstract locks and a set of compensating actions. As discussed below, abstract locks can define rules, generally expressed as logic or pure expressions, that enables the distributed database system 100 to determine when transactions conflict. To this end, compensating actions include a first action to execute if a transaction conflicts and a second action to execute if the transaction does not conflict.

Figure 5A:
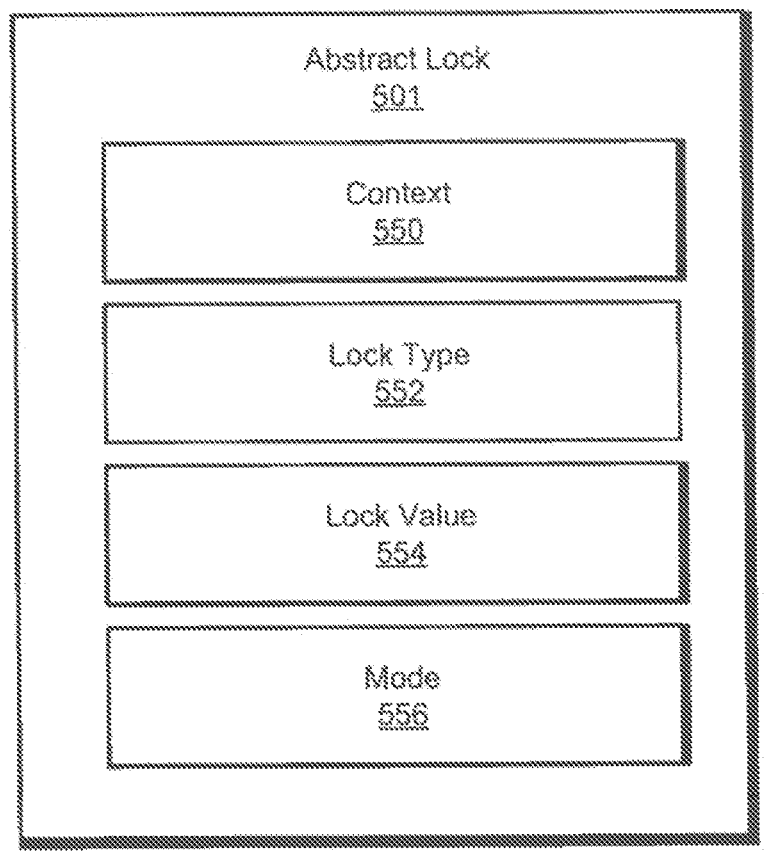
FIG. 5a depicts a block diagram representing one example abstract lock, in accordance with an embodiment of the present disclosure.
Figure 5B:
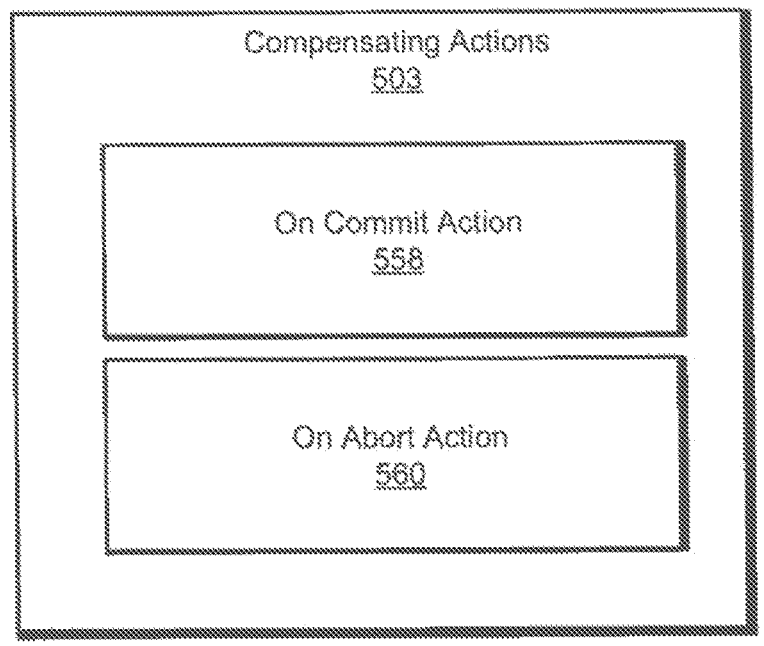
FIG. 5b depicts a block diagram representing one example set of compensating actions, in accordance with an embodiment of the present disclosure.

Referring now to FIGS. 5a and 5b, block diagrams depict one example of an abstract lock 501 and a set of compensating actions 503, respectively. As shown, the abstract lock 501 includes a context 550, a lock type 552, a lock value 554 and a mode 556. The context 550 identifies at least one database object affected by a query. The context 550 identifies this object based on, for example, a value appearing in a column, or a set of columns. The lock type can be chosen based on a pre-determined set of different types, wherein each lock type refers to a specific type of overlap predicate chosen to reflect the application's data semantics. Specific examples of lock types will be described below. The lock value 554 includes the salient elements of the database state when the transaction created the abstract lock. These values can be later used for overlap predicate evaluation during healing, and are dependent upon the type of lock being created. The mode 556 includes a value that denotes if the lock is exclusive or non-exclusive. For example, an exclusive lock prevents other transactions that affect the same identified database object as defined by the context. On the other hand, a non-exclusive lock enables other transactions to also modify an identified database object (if the transactions do not otherwise conflict).

In general, each type of lock is intended to summarize some data semantics of the application running the transaction. For example, one particular kind of lock type can be a 'point' or 'value' lock. This lock is just over a specific value, and the overlap predicate is simply equality (the locks overlap if their values are equal). This type of lock can be used to enforce semantics such as uniqueness. For instance, an application requires that in a table with multiple columns, the ordered pair (column1, column3) is unique for all rows. To enforce this with abstract locks, a transaction that inserts a row would also create a 'value' abstract lock whose value would be the actual (column1, column3) pair inserted. The lock's mode would be Exclusive, in this case, in order to ensure conflict with any other lock with those values.

Another lock type is a range lock, wherein the overlap predicate determines if two ranges of values overlap. This type of lock is useful for semantics that cover groups of values. For example, an application may require that the results returned from a search query be precise (e.g. "all people in this zip code between age 40 and 45"). A transaction performing such a query can create a range lock, whose context can include the age column, and whose values can be 40 and 45 (to reflect the lower and upper bounds of the query). If the mode is shared, then this query would not necessarily conflict with any other queries. Conversely, another transaction that attempted to insert a new person record with the age of 41, for instance, can conflict with this range lock if the Mode is exclusive because it would have a range overlapping 40-45.

More sophisticated locks are also within the scope of this disclosure. One such example includes an 'exists' lock, wherein the application asserts that it requires that a specific row (or rows) exist. Consider an application that is updating the address field for a particular customer row. Normal SQL behavior permits updates that modify no rows, and considers them successful. Therefore, an abstract lock is needed to ensure the requirement that there will "exist" a row for that particular customer. Note that an instance of the 'Exists' lock depends on both the row values at the time it is created, as well as the new global state at the time it is checked for overlap.

Another such example lock type is a bound lock that depends both on the values at the time of creation, and the evolving database state at healing time. In use, a bound lock is configured to handle updates to bounded counters. A bound lock is appropriate over a counter row/column, and includes a value for both the initial and final state of that counter as well as any minimum or maximum bound on the counter row itself. Then, at healing time, the bound lock is "safe" to take if the change in counter value does not violate either the minimum or maximum bound of the row's value, at the point the lock is taken during healing. For example, consider a row with value 5, and for whom the application asserts that the counter must be no less than 0 and no more than 100. A transaction that updates the row to 75 can create a bound lock that records the rows starting value (5) and final value (75), as well as the bounds (min=0, max=100). At some point in the future when healing occurs, the bound lock can be examined. At that point, there is no particular guarantee that the value of that row in the evolving global healing state will necessarily be 5. Assume, for example, that it is actually 11. The healing node can then determine if it can take the bound lock by applying the difference (70) to the current row value and then checking that it is between the minimum and maximum bounds for the row. In the context of this example, the starting value is 11, the final value would be 81, and that lies between 0 and 100. Therefore the bound lock may be taken. However, if there was another lock for another transaction that also added 70 to the same row, the bound lock for that transaction could not be taken, and therefore the transaction that would cause the row's value to violate its constraints would not be evaluated during healing.

In an embodiment, the distributed database system can include a predefined set of locks whose overlap is determined by, for example, application developers seeking to enforce particular unique constraints or database consistency. While numerous lock types are discussed above, not all lock types necessarily need to be implemented to support various disconnected operations disclosed herein. Each lock type can express, in some form, some higher-level semantic requirement of the application. Any lock type with a given predicate can be used for conflict detection during healing if that lock's predicate can be evaluated, given values known when the lock was created under partition as well as against the state of the database at healing time (which includes any locks already taken by the healing process). Thus, and in accordance with an embodiment, a library of lock types for a given application can evolve and grow in response to user needs and changing data storage requirements.

The interaction of these abstract lock properties can better be understood by way of example. Consider, for instance, that a TE node provisionally commits a first transaction within Region 1 of FIG. 4 that creates a new record in a table, wherein that table identifies each record by a unique key value within a particular column. For the purpose of simplicity, assume that the new record includes a unique key value of 1. Now consider that a TE provisionally commits a second transaction in Region 2 that creates a new record in the same table, with that record also having a unique key value of 1. So, an abstract lock created for each of the first transaction and the second transaction include similar properties based on an abstract lock policy for the particular table affected by the transaction. Stated differently, each abstract lock will comprise logic that essentially states that each new record inserted into the particular table requires a unique key. So, these properties enable healing node(s) to identify that the abstract locks are related, and in this particular case, that the abstract locks conflict. In particular, the abstract locks created for each transaction identify a context 550 including the same table and the same affected columns within that table. In addition, the abstract locks also include a lock type 552 that identifies a value lock type, with that value lock protecting a row value 554 of "1". So, the distributed database system 100 can compare the abstract locks to each other to identify that the abstract locks are related by context, and that their related transactions conflict in this specific example because the values of both locks are equal. This is an example of how a global requirement (uniqueness of keys within a table), can be summarized and represented by locks so that those constraints are checked and verified during healing. Correctly specified locks can ensure that the final database state after healing does not violate the constraints that the application developer specified for their particular application's data.

Referring now to FIG. 5*b*, a block diagram depicts one example set of compensating actions including an on commit action 558 and an on abort action 560. The abort action can be accurately described as a logical undo action. The on commit action 558 includes an instruction to perform on non-conflicting transactions. In an embodiment, the on commit action 558 comprises SQL statements to execute and apply the transaction. In another embodiment, the on commit action 558 comprises a non-SQL command such as a binary structure or other suitable object. As discussed below with regard to FIGS. 8*a-d*, a healing node 104*a* utilizes on the on commit action 558 to construct a new global state for the database.

Returning to FIG. 4, the admin nodes 104*a* and 104*b* can monitor network connectivity between database nodes to determine if the distributed database system 100 is fully connected (e.g., all database nodes in Region 1 and 2 are accessible through the communication network 101'). In an embodiment, admin nodes 104*a* and 104*b* perform this determination based on a ping operation, or other network operation as will be apparent in light of this disclosure. In response to determining the distributed database system 100 has reestablished network connectivity between regions, and thus is fully-connected, the admin nodes 104*a* and 104*b* can wait for a user command to initiate a healing process, or automatically initiate the healing process. During healing at least one healing node (e.g., a TE node) is responsible for carrying out the healing process. Once healing is complete, the distributed database system can "switch over" to the new global state such that all transactions provisionally-committed by each isolated region are accounted for and database queries performed in either region "see" and manipulate an identical version of the database.

Methods

Figure 6:
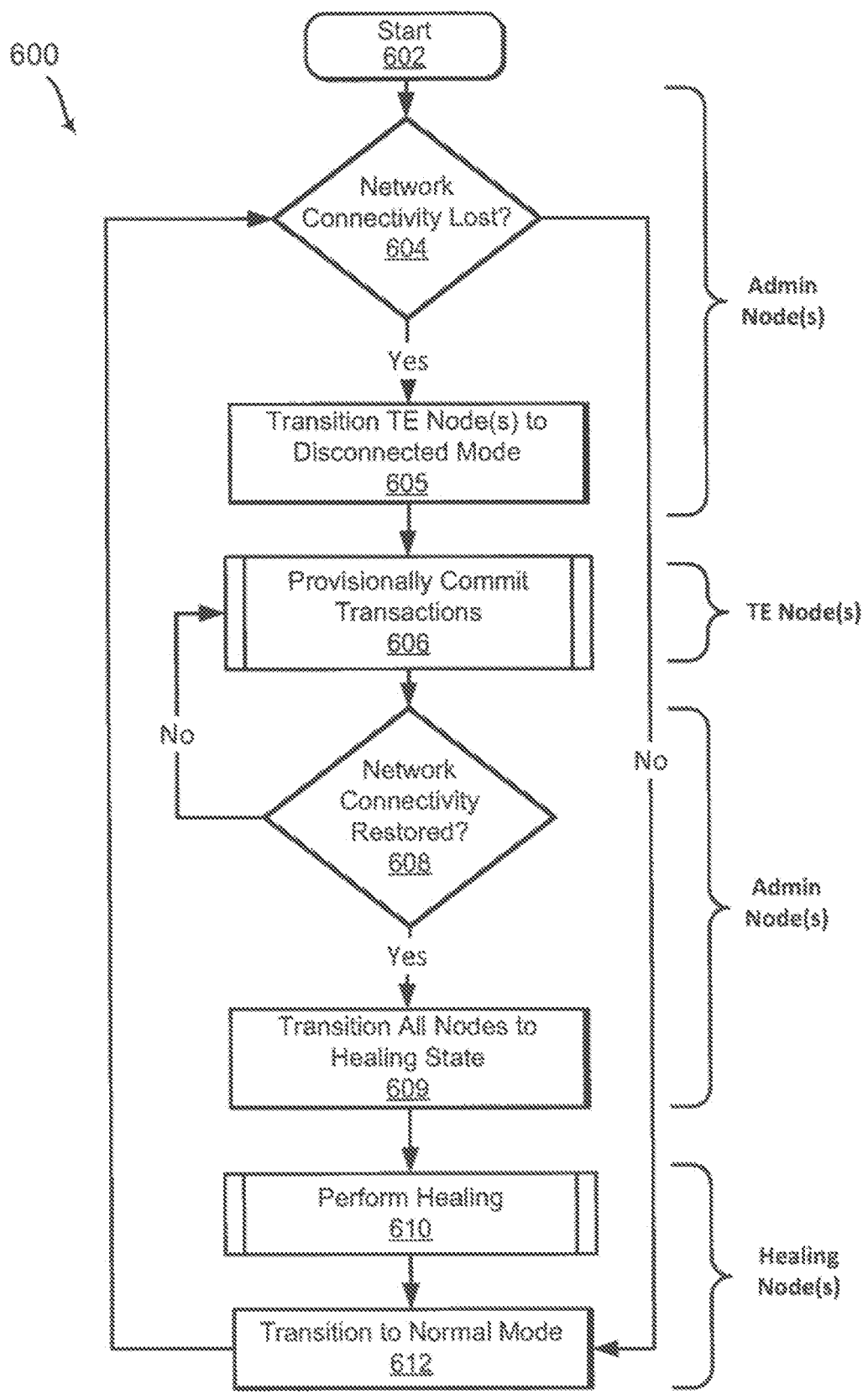
FIG. 6 is flowchart illustrating one example method for determining network connectivity between regions of nodes within a distributed database system and transitioning to and from disconnected operation in response thereto, in accordance with an embodiment of the present disclosure.

Referring now to FIG. 6, a flowchart is shown illustrating an example method 600 for determining network connectivity between regions of database nodes within a distributed database system, and transitioning to and from disconnected operation in response thereto. Aspects of method 600 may be implemented, for example, by the distributed database system 100 of FIG. 1, and more particularly by a TE node. Note that the admin node can include modules from the example TE/SM architecture 200 and 201 of FIGS. 2*a-b*, respectively, which enable it to also perform healing operations. The method 600 begins in act 602.

In act 604, an admin node determines if network connectivity is lost between regions of the distributed database system 100. In some cases, this includes the admin node pinging one or more nodes within other regions. In other cases, this includes a TE node within the same region as the admin node pinging one or more nodes within other regions. In these cases, the TE node can send a message to the admin node indicating if network connectivity issues were detected. In any such cases, the method 600 continues to act 605 if a network connectivity issue is detected; otherwise, the method 600 continues to act 612.

In act 605, the admin node transitions its respective region to a disconnected mode of operation such that TE nodes within its respective region begin provisionally committing transactions. Recall that, in an embodiment, transactions are provisionally committed even during normal operation in anticipation of a network failure. To this end, transitioning to a disconnected mode of operation refers to the notion that a garbage collection process is suspended, and thus, a transaction log is allowed to grow in preparation for healing. The admin node can cause this transition based on, for example, a message broadcast to each TE node within its respective region. In act 606, each TE node provisionally commits a database transaction received from a database client and logs one or more abstract locks and a set of compensating actions for that transaction. This provisional commit can include, for example, the TE node broadcasting a replication message to each peer database node within its respective region such that each respective copy of the database is updated in accordance with the received transaction. In an embodiment, the TE commits the one or more abstract locks and the compensating actions to durable storage by, for example, sending a message to an SM node to store the same.

In act 608, the admin node determines if network connectivity was restored between the admin node and other regions. In an embodiment, this includes the admin node successfully pinging (e.g., receiving a ping response) from one or more nodes in the other regions. In another embodiment, this includes each TE node within the admin node's region successfully pinging one or more nodes in the other regions. In this embodiment, the TE nodes can send a message to the admin node to indicate that network connectivity was restored. If the admin node determines each region of the distributed database system 100 is fully connected (e.g., all database nodes in each region are accessible through a communication network), the method 600 continues to act 609. Otherwise, the method 600 returns to act 606.

In act 609, the admin node transitions all nodes to a healing state. In some cases, the admin node can receive a user command that causes this state change to occur. In other cases, the admin node automatically changes to the healing state in response to detecting network connectivity.

In act 610, the admin node initiates a healing process. In an embodiment, the admin node initiates the healing process automatically after the distributed database system 100 becomes fully-connected. In another embodiment, the admin node initiates the healing process in response to a user command. In any such cases, initiation of the healing process can include the admin node sending a "initiate healing" request message to one or more TE nodes such that they transition operationally into a healing node in response thereto. As discussed below with regard to FIG. 8*a*, the healing process enables the distributed database to account for all provisionally-committed transactions and construct a new global state for the database. After the healing process completes, the method 600 continues to act 612.

In act 612, the healing node causes each database node within its respective region to transition to a normal mode of operation. Note if each database node is already in a normal mode, the database nodes can ignore this transition message. The method 600 then returns to act 604 to repeat acts 604-612.

Figure 7:
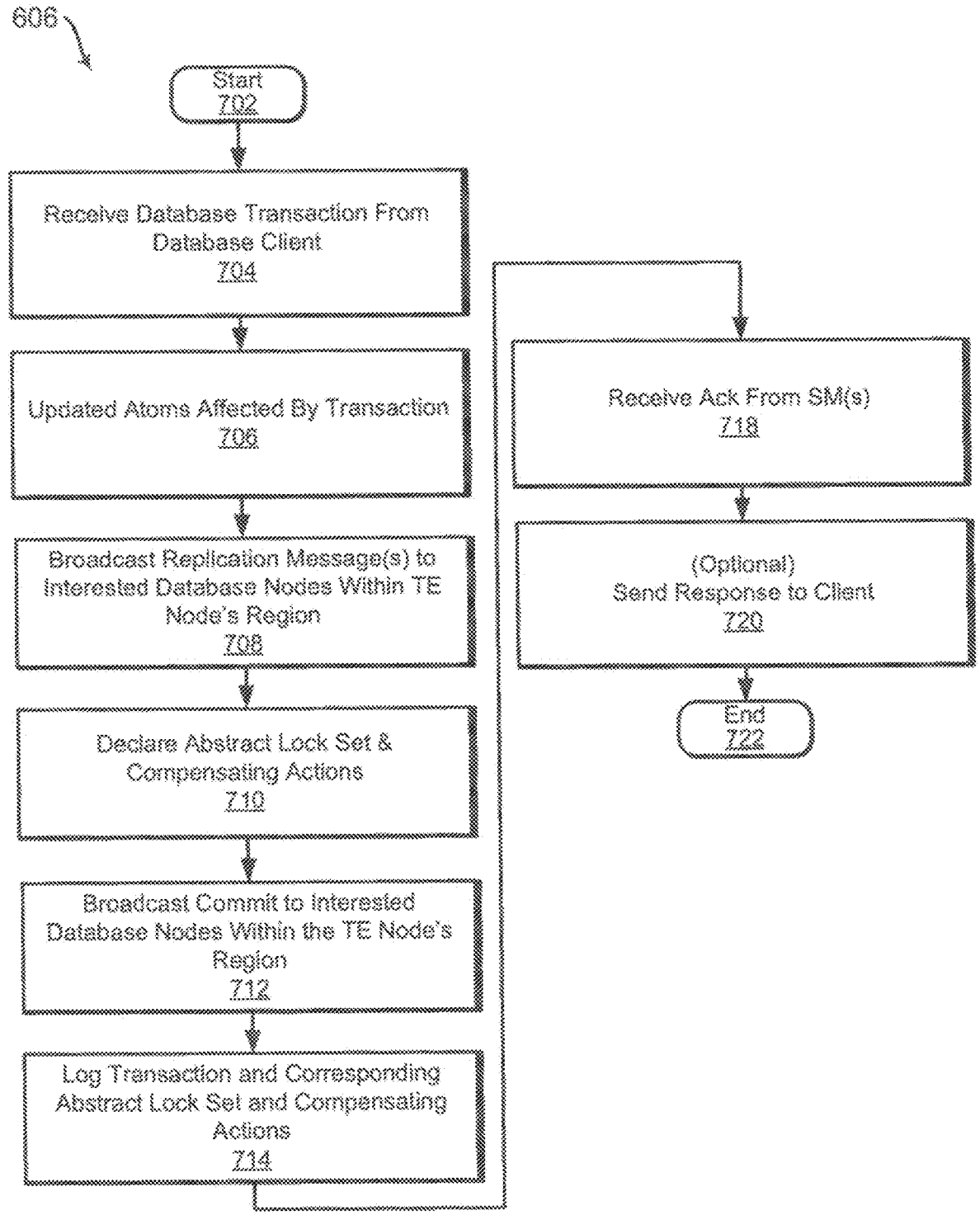
FIG. 7 is a flowchart illustrating one example method for provisionally committing transactions within a distributed database system during a disconnected mode of operation, in accordance with an embodiment of the present disclosure.

As described above with reference to act 606, some aspects of the present disclosure include a TE node that, while in a partially disconnected mode, can provisionally commit database transactions, and for each of those transactions, log one or more abstract locks and a set of compensating action. One such example of a provisional commit method 606 performed by a TE node is depicted in FIG. 7. Note that while method 606 is illustrated as a linear process, method 606 is not limited in this regard. For example, various acts may be performed in a different order with the result being substantially the same. That is, the TE node can process a transaction while in a disconnected mode such that a copy of the database on each database node within the TE node's region is updated in accordance with the transaction, thus satisfying local requirements, and in addition, commit that transaction with information (e.g., one or more abstract locks and a set of compensating actions) that enables a subsequent healing process to satisfy global requirements of the transaction. Method 606 begins in act 702.

In act 704, the TE node receives a transaction to perform on behalf of a database client during a disconnected mode of operation. In act 706, the TE node updates atoms affected by a transaction received from a database client. Recall that all database objects can be represented by atoms within the distributed database system 100. The atom to SQL mapping module 208 enables the TE node to determine which atoms are affected by a given query based on the database objects referenced in the query. So, the TE identifies those atoms affected by the transaction and a location to acquire those atoms from. In some cases, the TE node has at least some of the atoms needed to service a transaction within its atom cache. For example, the TE may have previously performed a transaction that required a number of the same atoms affected by the transaction. So, if affected atoms are within the TE node's atom cache, the TE performs update operations on those in-memory atoms in accordance with the transaction. If one or more of the affected atoms are not within the TE's atom cache, the TE node can retrieve those atoms from the atom cache of peer nodes (e.g., TE nodes, SM nodes and SSM nodes). Where a miss occurs, the TE retrieves atoms from durable storage of an SM node to service a transaction.

In any event, the TE causes atom updates to occur such as, for example, new atoms to be created or existing atoms to be updated. For instance, the TE node performs data manipulations (e.g., inserts, updates, deletes) specified in the received transaction. These data manipulations can comprise data manipulation language (DML), or an equivalent thereof, that causes atoms to be updated in a manner that alters the database objects represented by those atoms. As discussed above with regard to FIG. 3, this can include appending or otherwise adding additional version states to each affected atom. Within the context of ACID properties and MVCC functionality, this enables each transaction to manipulate database data without causing concurrent transactions to see an intermediate or otherwise invalid database state.

In act 708, the TE node broadcasts replication messages to each "interested" database node within the TE node's region. As discussed above, SM nodes receive such messages to ensure an identical version of the database persists in durable storage. A TE node may also have a portion of the database in their respective atom cache, and thus, receive the replication messages to update those portions of the database. Therefore, each database node with an interest in the transaction receives a replication message. Note that the updates performed by TE nodes and SM nodes are not "visible" such that clients are unable to query for those changes until the TE sends a commit message in act 712. So, the TE can roll-back changes in the event a transaction fails. Such roll-back can include, for example, the TE sending a destructive replication message that causes each database node within its region to remove those changes.

In act 710, the TE node declares one or more abstract locks and a set of compensating actions for the transaction received in act 704. A given transaction can affect multiple tables and records within those tables. The TE node can create one or more abstract locks to maintain the consistency requirements of the transaction. For example, each insert into a table with uniqueness constraints can generate a lock for each new unique value inserted. The distributed database system 100 can include an abstract lock policy for each table. The abstract lock policy can identify one or more database objects and lock types to apply to those database objects. For example, consider a transaction that decrements an amount of money from a first bank account and increments the same in a second bank account, with each bank accounted represented by a record in a table named "customer_accounts." The TE node creates at least two locks for this example transaction: a first lock directed to the record affecting the first bank account and second lock directed to the record affecting the second bank account. The TE node can utilize the abstract lock policies assigned to the customer_accounts table to determine what lock types to apply, if any. For example, the customer_accounts table can include a lock type of range on a column that represents a balance of an account. In this example, the predetermined range can include, for example, a lower boundary of 0 and an upper value of 10000.

Thus for each record affected by the transaction, the TE creates an abstract lock and sets the context 550, the lock type 552, the lock value 554, and the mode 556 accordingly. For example, the TE node sets the context 550 by identifying the database objects associated with an affected record; the lock type 552 based on the abstract lock policy for a table associated with the affected record; a lock value 554 based on an actual value to change in the affected record; and a mode 556 based on the particular abstract lock policy for the table associated with the affected record. In addition, the TE node creates a set of compensating actions for the transactions. In a general sense, compensating actions are essentially mini-transactions that either cause the transaction to get applied to the database during the healing process, or cause the transaction to be rolled-back such that database nodes within the region that provisionally-committed the transaction (e.g., applied atom updates in accordance with the transaction) "undo" those changes.

In act 712, the TE node broadcasts a commit message to each interested database node within the TE node's region. In response, each interested node finalizes those changes made during act 708 such that subsequent queries by database clients "see" those changes (assuming the client performed the query utilizing a TE node within the same region).

In act 714, the TE node logs the transaction received in act 704, the one or more abstract locks, and the set of compensating actions determined in act 710. In an embodiment, the TE node updates a transaction log within, for example, durable storage, such that a sequence of committed transactions is maintained and retrievable in the event of, for example, power cycles and reboots. In this embodiment, the TE node can transmit replication messages to one or more SM nodes within its region, similar to act 708, to update the transaction log stored within durable storage. In act 718, the TE node receives an acknowledgement from the one or more SM nodes that indicate the transaction log was successfully updated in durable storage.

In act 720, the TE node optionally sends a response to the database client that sent the request to perform a database transaction. In some cases, a transaction includes a query (e.g., a read operation) that returns a result set, and the response can include that result set. In other cases, the response comprises a code or other value (e.g., an exception message) that indicates to a database client if the transaction succeeded or failed, as the case may be. The method 606 ends in act 722.

Figure 8A:
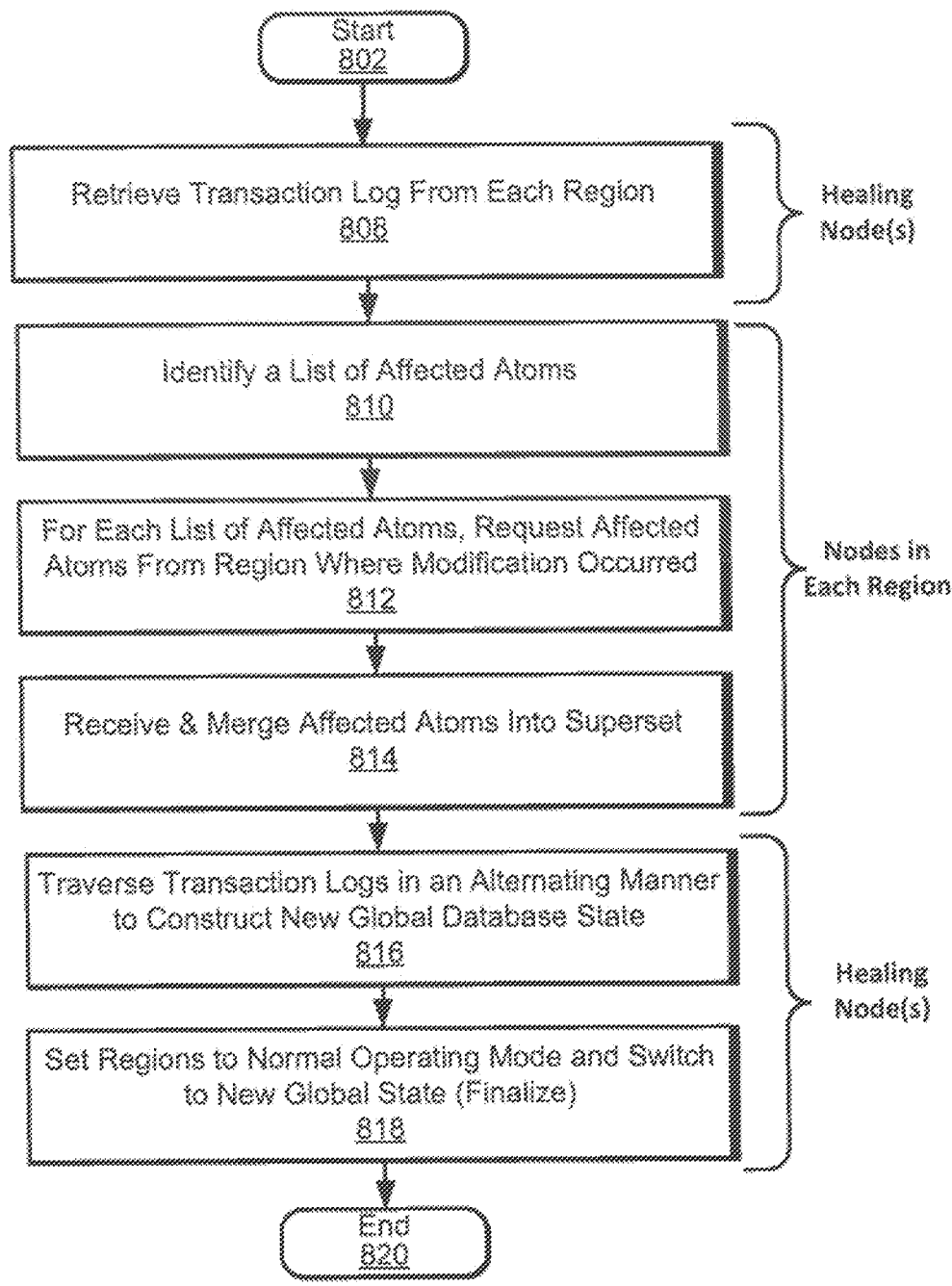
FIG. 8a is a flowchart illustrating one example method for healing within a distributed database system after network connectivity is reestablished between regions of database nodes, in accordance with an embodiment of the present disclosure.

As described above with reference act 606 of FIG. 6, some aspects of the present disclosure include a healing process that, after network connectivity between each region is reestablished, enables the distributed database system 100 to construct a new global state of the database based on transactions provisionally-committed within each region. One such example healing method 610 is depicted in FIG. 8a. Note that while method 610 is illustrated as a linear process, method 610 is not limited in this regard. For example, a healing node can perform some acts in a different order, or in parallel, as will be appreciated in light of this disclosure. In an embodiment, a healing node performs method 610, although as discussed above with regard to FIG. 6, other database nodes of the distributed database system could perform method 610. Recall that in act 608 of method 600 that an admin node can detect network connectivity was reestablished between its region and all other regions of the database system 100. Method 610 can be carried out in response to this determination. Method 610 begins in act 802.

In act 808, the admin node selects one or more TE nodes in a particular region to be responsible for healing the transaction logs. These healing nodes retrieve a transaction log from each region by sending a request to a database node in each region. For example, a healing node can send a request to an SM node in each region that stores a transaction log for its region in durable storage, or to a TE node that has the same log in-memory. In an embodiment, each transaction log includes entries that detail provisionally-committed transactions for that region, including one or more abstract locks and a set of compensating actions for each transaction.

In act 810, each database node in each region can identify all local atoms (for SMs it can be all atoms) that have been modified in any other region. In an embodiment each node does this by tracking modified atoms in the provisional transaction log. In another embodiment, each node does this by recording atom modifications in a lookaside data structure stored per-region.

In act 812, each database node that contains an atom copy that was modified by another region can request a copy of that atom from the region(s) that modified it. In an embodiment, a node can limit messaging by requesting such copies from a designated node in each region, and then relying on the atom serialization machinery to ensure consistency after the fetch. In response, the designated node for each region can send requested atoms to the node that originated the request.

Figure 8B:
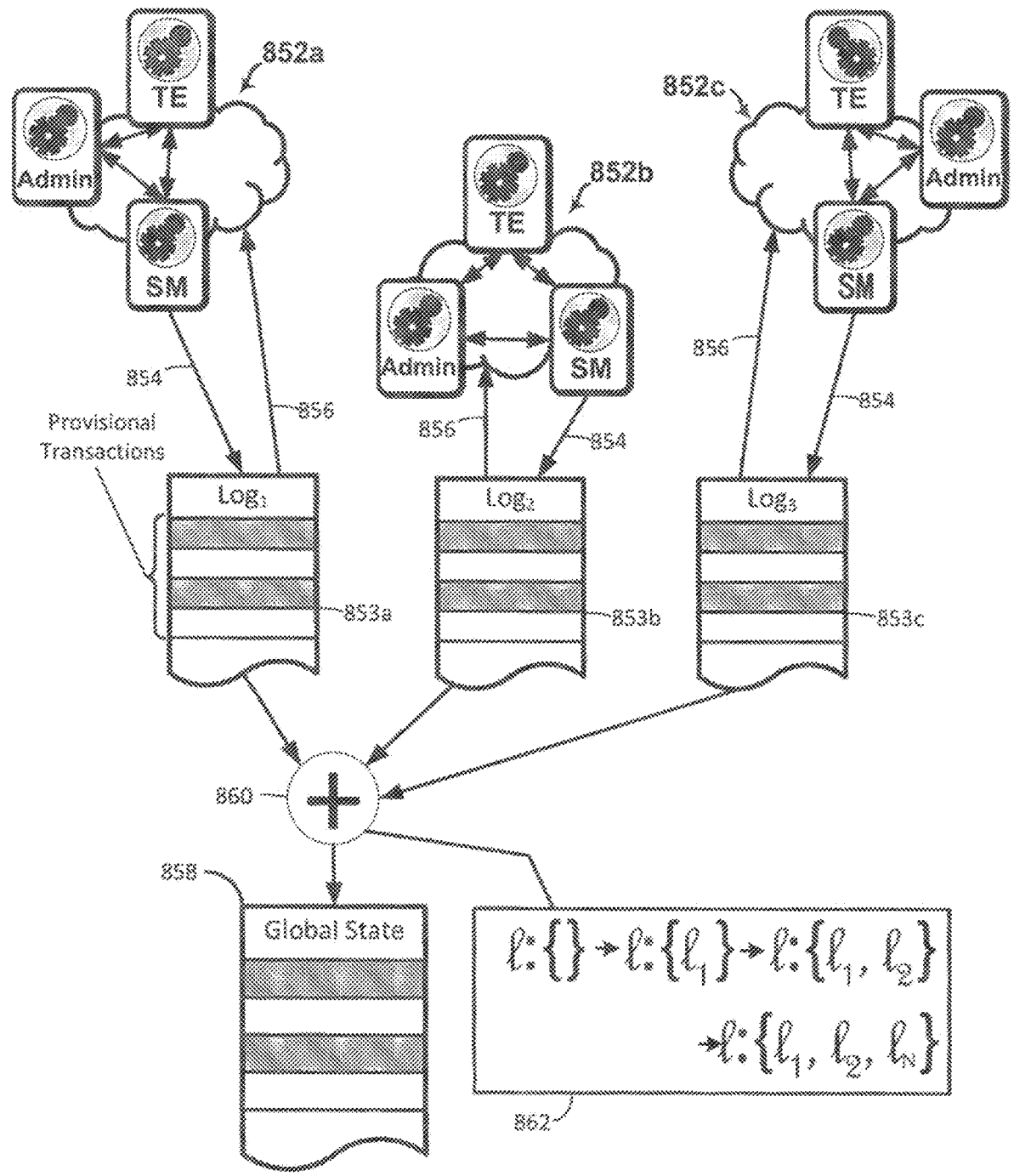
FIG. 8b illustrates one example process flow configured to traverse transaction logs from each region of database nodes to derive a new global state, in accordance with an embodiment of the present disclosure.
Figure 8C:
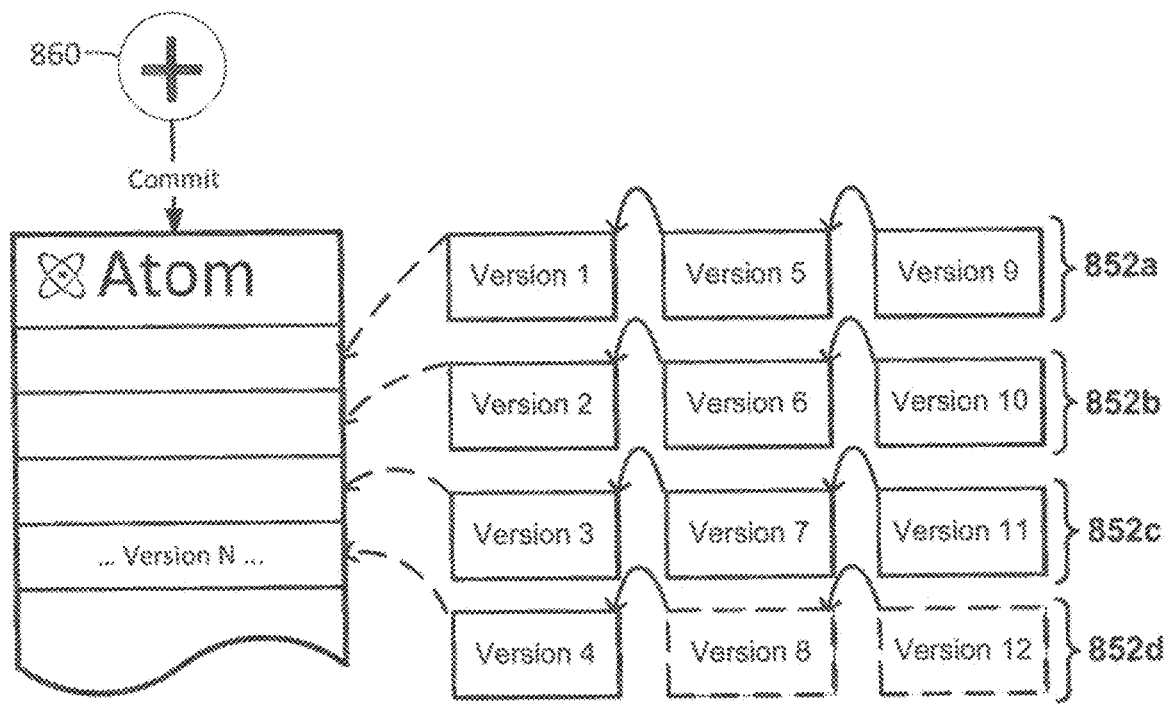
FIG. 8c is a block diagram illustrating one example superset atom as modified during performance of the healing method of FIG. 8a, in accordance with an embodiment of the present disclosure.

In act 814, the requesting node receives the affected atoms requested in act 812 and merges the atom state into superset of atom state composed of the local region state combined with the state from the requested region. For example, consider a simplified database that consists of two atoms, atom A and atom B, and two regions of database nodes. During the disconnected mode of operation, each region updates atom A and atom B unaware that other region is doing the same. When the healing node merges atoms from each region, the result is a superset that includes both atoms A and B, with those superset atoms having multiple versions therein corresponding to each region. Supersets can be better understood by illustration. FIG. 8c shows one such example illustration. As shown, the superset atom includes versions from a first region 852a, a second region 852b and a third region 852c. Each respective region occupies a particular set of reserved version addresses as determined by a versioning scheme. For example, region 852a occupies a reserved version of 1, 5, 9, 16 and so on. Likewise, region 852b occupies versions 2, 6, 10, 14 and so on. Thus, each superset atom includes a number of versions from each region, with versions from each region being identified based on a versioning scheme that reserves specific versions for each region. In other embodiments, a node can utilize a different versioning scheme to identify which region installed a particular version, and therefore, this disclosure should not be considered limited in this regard. For example, a node can utilize a map that enables a region to be looked-up by an atom version. Therefore after each node has merged all disjoint region state into its local atoms, every node in each region has a complete set of versions representing the full database state produced during disconnected operation.

Returning to FIG. 8a, and continuing to act 816, the healing node traverses the transaction logs from each region in an alternating manner to construct a new global state for the database. In an embodiment, the healing node alternates processing provisional transactions from each transaction log in a round-robin fashion. In other embodiments, the healing node algorithmically determines the order and frequency a particular transaction log is processed based on statistical analysis or heuristics, or both. In one example, statistical/heuristic analysis can include so called "look-ahead" processing that seeks to process transactions having certain similar characteristics. For instance, the healing node can optimize healing by analyzing transactions and finding those transactions that seek to operate on similar portions of the database.

In any event, the healing node alternates between each transaction log to construct a new global state for the database until exhausting all transaction logs. FIG. 8b illustrates on such example and depicts the processing of transaction logs from three different regions. As shown, FIG. 8b includes a first region 852a, a second region 852b, and a third region 852c, with each region having a transaction log 853a, 853b and 853c, respectively. In act 808 discussed above, the healing node requests the transactions logs from each region. The directionality of this request is represented by communication arrows 854 extending from each region to a respective transaction log 853a-c.

Once the healing node receives the transaction logs 853a-c, the healing node alternates through each transaction log to derive a new global state 858 for the database at 860. In 860, the healing node does this by comparing the abstract locks from a provisional transaction against a collection of abstract locks 862 and the current global state. The first time the healing node performs this comparison, the abstract lock collection 862 is empty. So, the first provisional transaction succeeds, and thus, the healing node commits that transaction to the new global state 858. The TE node also adds the abstract locks from the first provisional transaction to the abstract lock collection 862. The healing node then compares a subsequent provisional transaction to the populated abstract lock collection 862 (and global state). In an embodiment, the healing node does this by comparing the one or more abstract locks for the subsequent provisional transaction to each abstract lock in the abstract lock collection 862. If any abstract lock of the subsequent provisional transaction conflicts with any abstract lock within the abstract lock collection 862, the healing node must abort that provisional transaction. Note that a provisional transaction can include multiple abstract locks. Therefore, if any one of those abstract locks conflict, the healing node must abort the entire transaction. For example, consider $L_1$ to represent the one or more abstract locks of the first provisional transaction within the abstract lock collection 862. If the subsequent transaction includes a first and second abstract lock (e.g., to modify multiple database objects), neither of those locks can conflict with any abstract lock within $L_1$.

Conflict, therefore, is a result of determining whether two or more transactions can commute in the new global state 858. As discussed above, each table can include an abstract lock policy that defines the rules that are used to determine which transactions commute. In a general sense, these rules operate on data models in a high level manner versus merely identifying that two transactions conflict because they seek to manipulate a same record, or the same physical location in a database. When a TE node creates an abstract lock, the rules of the abstract policy become later actionable during the healing process. Some aspects of conflict detection within the context of the method 610 can be better understood by way of example.

Recall an earlier example wherein a transaction performed during disconnected mode in a first region seeks to subtract an amount of money from a customer's account. Now if at the same time (or around the same time during disconnected mode) a TE node in another region performs a second transaction that seeks to increment an amount of money in the same customer's account, the first and second transaction may, or may not conflict, as the case may be. In this instance, the TE nodes executing the first and second transaction can declare an abstract lock that, in short, reflects an abstract lock policy implemented to define logical rules that enable the healing node to determine a conflict. Within this specific example, one such policy can seek to ensure a customer's balance cannot go below a particular threshold amount (e.g., a zero balance). To do this, a TE node can create an abstract lock with a lock type of bound, with the initial and final balance as well as a lower bound of 0 (assuming that this particular application has no upper bound on account balances). Thus, the healing node, when processing those transactions during method 610, can compare the respective abstract locks to determine if a conflict exists. So, as long as neither the first or second transaction cause the balance to go below zero, both transaction can succeed such that the healing node commits each transaction to the new global state 858, and adds those abstract locks associated with each transaction to the collection of abstract locks 862. However, if the healing node processes a third transaction that seeks to decrement an amount that causes an overdraft (e.g., a below zero balance), that transaction's abstract lock conflicts, and thus, the healing node must abort that action. As shown, each time a non-conflicting transaction is processed by the healing node, the collection of abstract locks 862 grows. This growth is depicted as the abstract lock collection L growing to include additional locks $L_1$, $L_2$, and $L_N$ over time.

In the event of a conflict, the healing node can utilize the on abort action 560 to cause a particular region to logically "undo" those changes caused by the provisional transaction. The directionality of this on abort operation is represented by communication arrows 856 extending from each transaction log to a respective region. On the other hand, the healing node commits the provisional transaction (by executing the on commit action) to the new global state 858 if that provisional transaction does not conflict.

Referring now to FIG. 8c, with additional reference to FIGS. 8a-b, a block diagram illustrates one example of how the healing node constructs a new global state for the database. Note the example embodiment of FIG. 8c is simplified to include just one superset atom for the purpose of clarity. However, the healing node can update any number of such superset atoms across regions when constructing a new global state.

As shown, at 860 the healing node commits a provisional transaction to the global state when that transaction does not conflict. This includes the healing node modifying one or more superset atoms affected by the transaction. Within the example embodiment of FIG. 8c, this is shown by the atom versions corresponding to global state version chain 852d. Note that some versions of atoms can be the result of transactions committing during normal operation (e.g., all regions accessible via the network), and those versions can be the starting point for constructing a new global state during the healing process. For example, Version 4 could be a version of the superset atom committed prior to network interruption causing a disconnected mode of operation. So, returning to the previous example, this means that Version 8 could represent the amount decremented from a customer's account, based on a first transaction, and Version 12 could represent the amount added to the customer's account, based on the second transaction. The healing node thus chains these new versions off of the last version committed prior to the disconnected mode of operation (Version 4). These new versions within the global state version chain 852d occupy a reserved section of version identifiers such that the database can recognize those version chains corresponding to the new global state 858.

In an embodiment, each time a new version is added to the global state 852d, the healing node sends a replication message to all interested database nodes in the distributed database system, with that replication identifying an atom to modify and the newly added version. In turn, each database node receives the replication message and appends the newly created version to their copy of the identified atom. So, the healing node can build the new global state 858 within each database node of the database system while those database nodes continue to process transactions in their respective regions. Because the distributed database system 100 reserved the version identifiers for the new global state chain 852*d*, the distributed database system can "switch over" to the new global state 858 for the database after the healing process completes, as discussed below.

As previously discussed, the healing method 610 can occur while each region continues to process transactions. To this end, each of the transaction logs 853*a*-853*c* can continue to grow by some degree before the healing node can fully traverse all of the transaction logs. The healing node also continues to add new versions to the superset nodes based on those provisional transactions committing. For example, the TE nodes within each region can broadcast replication messages associated with the provisional transactions. In an embodiment, the healing node receives those replication messages and updates each of the transaction logs 853*a-c*. Because each region's set of versions is disjoint from each other region's version (and the new global state versions being built by the healing node), the messages corresponding to those changes can be sent to all interested nodes within the database (even if they are in a different region). This can use the same mechanisms for change replication that the database uses when fully connected. The distributed database system 100 relies on the disjoint nature of the versioned atom state to isolate region changes until healing completes. Stated differently, those healed atom versions can utilize a versioning scheme that prevents those versions from being "visible" to database clients until healing completes.

Figure 8D:
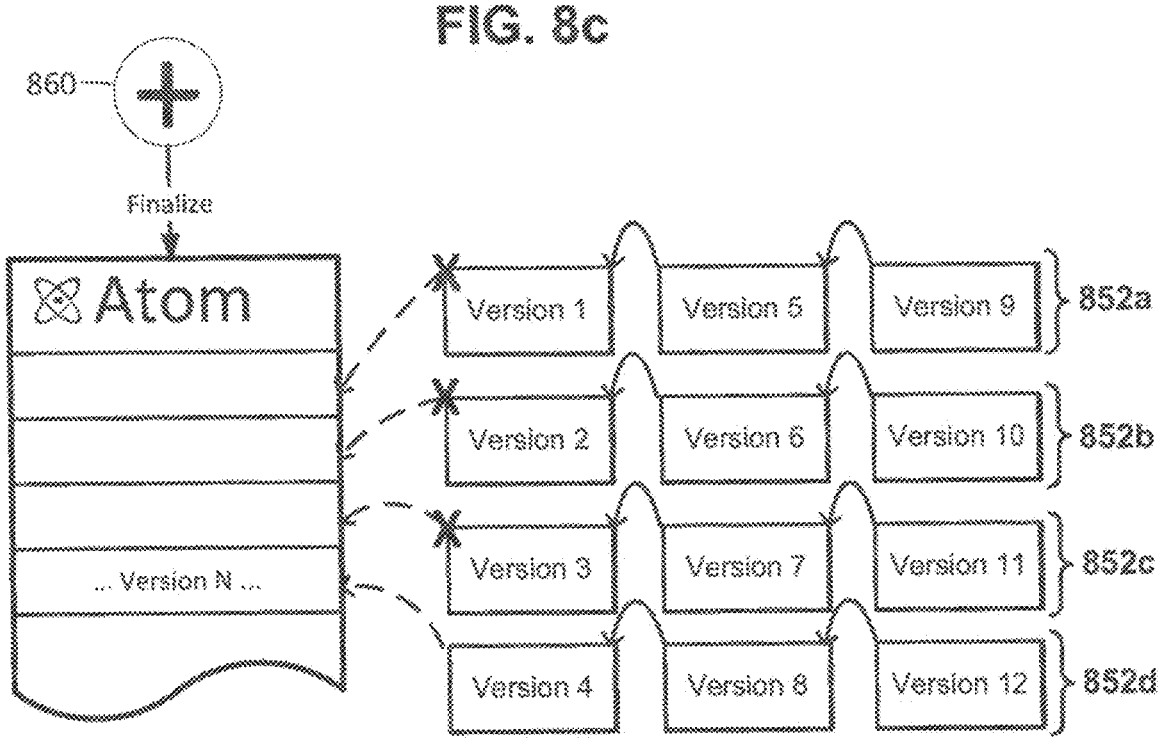

Returning to FIG. 8*a*, and act 818, the healing node sets each region of the distributed database to the normal operating mode and causes all database nodes within the distributed database system to "switch over" to the new global state. As discussed above, each database node thus utilizes versions corresponding to the global state version chain 852*d* such that a database version represented by those versions is "visible" to database clients performing queries. As shown in FIG. 8*d*, and at 860, this finalization also causes each of the superset atoms to remove or otherwise mark for deletion the past atom versions corresponding to the provisional transactions from regions 852*a*-852*c*. Likewise, the healing node can send a destructive replication message to each region such that each database node therein removes or otherwise marks for deletion all previous versions of atoms, other than those corresponding to the new global state. So, in an embodiment the healing node can simultaneously switch each database node, and by extension all regions, over to the new database state. Thus, each TE node of the distributed database system can subsequently query and service transactions on an identical version of the database across all regions. The method 610 ends in act 820.

Computer System

Figure 9:
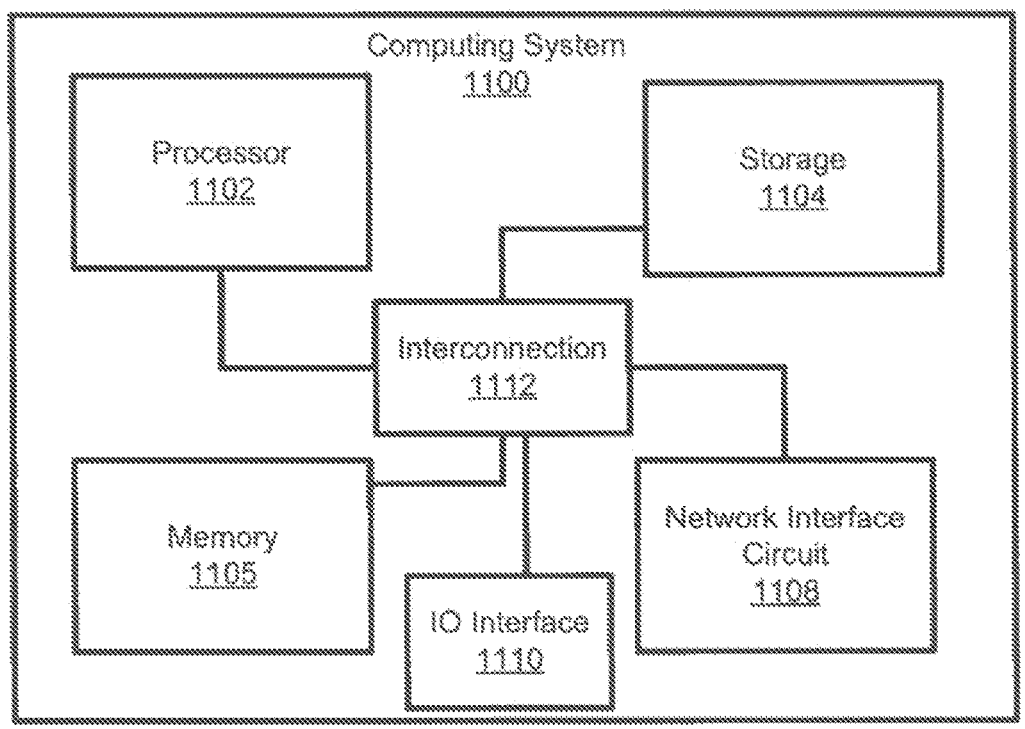
FIG. 9 shows a computing system configured to execute one or more nodes of the distributed database system, in accordance with an embodiment of the present disclosure.

FIG. 9 illustrates a computing system 1100 configured to execute one or more nodes of the distributed database system 100, in accordance with techniques and aspects provided in the present disclosure. As can be seen, the computing system 1100 includes a processor 1102, a data storage device 1104, a memory 1105, a network interface circuit 1108, an input/output interface 1110 and an interconnection element 1112. To execute at least some aspects provided herein, the processor 1102 receives and performs a series of instructions that result in the execution of routines and manipulation of data. In some cases, the processor is at least two processors. In some such cases, the processor may be multiple processors or a processor with a varying number of processing cores. The memory 1106 may be RAM and configured to store sequences of instructions and other data used during the operation of the computing system 1100. To this end, the memory 1106 may be a combination of volatile and non-volatile memory such as dynamic random access memory (DRAM), static RAM (SRAM), or flash memory, etc. The network interface circuit 1108 may be any interface device capable of network-based communication. Some examples of such a network interface include an Ethernet, Bluetooth, Fibre Channel, Wi-Fi and RS-232 (Serial) interface. The data storage device 1104 includes any computer readable and writable non-transitory storage medium. The storage medium may have a sequence of instructions stored thereon that define a computer program that may be executed by the processor 1102. In addition, the storage medium may generally store data in contiguous and non-contiguous data structures within a file system of the storage device 1104. The storage medium may be an optical disk, flash memory, a solid state drive (SSD), etc. During operation, the computing system 1100 may cause data in the storage device 1104 to be moved to a memory device, such as the memory 1106, allowing for faster access. The input/output interface 1110 may comprise any number of components capable of data input and/or output. Such components may include, for example, a display device, a touchscreen device, a mouse, a keyboard, a microphone, and speakers. The interconnection element 1112 may comprise any communication channel or bus established between components of the computing system 1100 and operating in conformance with standard bus technologies such as USB, IDE, SCSI, PCI, etc.

Although the computing system 1100 is shown in one particular configuration, aspects and embodiments may be executed by computing systems with other configurations. Thus, numerous other computer configurations are within the scope of this disclosure. For example, the computing system 1100 may be a so-called "blade" server or other rack-mount server. In other examples, the computing system 1100 may implement a Windows®, or Mac OS® operating system. Many other operating systems may be used, and examples are not limited to any particular operating system.

FURTHER EXAMPLE EMBODIMENTS

Example 1 is a system for administering a distributed database including two or more predefined regions communicatively coupled via a communication network, each region including one or more database nodes, the database nodes collectively forming the distributed database, the system comprising at least one memory storing executable software instructions, and at least one processor configured to access the at least one memory and to execute the software instructions to determine network connectivity status between the two or more predefined regions of database nodes, and in response to determining the connectivity has been restored: retrieve a transaction log from each predefined region of database nodes, and construct a new global state for the distributed database by at least: traversing each transaction log and committing non-conflicting transactions to the new global state, and causing conflicting transactions to be aborted such that a particular predefined region of database nodes that provisionally-committed a given conflicting transaction undoes database changes corresponding to the given conflicting transaction.

Example 2 includes the subject matter of Example 1, where the two or more predefined regions of database nodes includes a first region and a second region, and where database nodes of the first region are closer in physical proximity to the system than the database nodes of the second region.

Example 3 includes the subject matter of any of Examples 1-2, where the at least one processor is further configured to determine the network connectivity based on a ping message sent via the communication network.

Example 4 includes the subject matter of any of Examples 1-3, where each transaction log includes a list of provisionally-committed transactions, each provisionally-committed transaction including one or more abstract locks and a set of compensating actions.

Example 5 includes the subject matter of Example 4, where each abstract lock identifies at least one database object and one or more logical rules to determine a conflict when a transaction seeks to manipulate the at least one database object.

Example 6 includes the subject matter of any of Examples 4-5, where the set of compensating actions includes a first action to commit a given provisionally-committed transaction to the global state if that transaction does not conflict, the first action configured to cause an update to the global state in manner that closely approximates a state of the database had the transaction executed prior to a network interruption, and a second action to abort a given provisionally-committed transaction if that transaction does conflict, the second action configured to cause performance of a logical undo on a region of database nodes that provisionally-committed a conflicting transaction such that a resulting database state visible within that region approximates a state of the database had the transaction not been executed in that region.

Example 7 includes the subject matter of any of Examples 1-6, where the system further comprises an abstract lock collection stored in the at least one memory, and where the at least one processor is further configured to determine whether a transaction is conflicting or non-conflicting by comparing one or more abstract locks associated with a transaction to each abstract lock stored in the abstract lock collection.

Example 8 includes the subject matter of Example 7, where the at least one processor is further configured to, in response to determining a transaction is non-conflicting, add one or more abstract locks associated with that transaction to the abstract lock collection.

Example 9 is a computer-implemented method for administering a distributed database, the method comprising: determining, by a processor, a network interruption has occurred between at least two regions of database nodes communicatively coupled via a communication network, the at least two regions of database nodes forming the distributed database, and where the network interruption isolates a first of the at least two regions such that database nodes within the first region can communicate with each other, but not with database nodes in others of the at least two regions, and in response to determining the network interruption has occurred, transitioning each region of the at least two regions of database nodes into a disconnected mode of operation in which each database node provisionally commits database transactions requested by one or more database clients such that the database stored in each database node can be subsequently and transparently updated in accordance with the provisionally-committed transactions.

Example 10 includes the subject matter of Example 9, the method further comprising: for each provisionally-committed transaction, creating one or more abstract locks based on database objects affected by a given transaction, and a set of compensating actions, and storing each provisionally-committed transaction as an entry in a transaction log with the one or more abstract locks and the set of compensating actions.

Example 11 includes the subject matter of any of Examples 9-10, the method further comprising: determining network connectivity has been restored between the at least two regions of database nodes, in response to determining network connectivity has been restored, retrieving a transaction log from each region of database nodes; and constructing a new global state for the distributed database by at least: traversing each transaction log and committing non-conflicting transactions to the new global state, and causing conflicting transactions to be aborted such that a particular region of database nodes that provisionally-committed such a conflicting transaction undoes database changes corresponding to that conflicting transaction.

Example 12 includes the subject matter of Example 11, where committing non-conflicting transactions to the new global state further comprises sending a replication message to each database node of the distributed database, the replication message identifying a database object and a new version to append to that database object.

Example 13 includes the subject matter of any of Examples 11-12, further comprising transitioning each database node to the new global state, where transitioning includes each database node to remove or mark for deletion all previous versions of database objects within their respective copy of the database that are not associated with the new global state.

Example 14 includes the subject matter of any of Examples 11-13, where the method further comprises determining whether a transaction is conflicting or non-conflicting by comparing one or more abstract locks associated with the transaction to one or more abstract locks stored in an abstract lock collection.

Example 15 includes the subject matter of Example 14, where the method further comprises, in response to determining the transaction is non-conflicting, adding one or more abstract locks associated with the transaction to the abstract lock collection.

Example 16 is a non-transitory computer-readable medium having a plurality of instructions encoded thereon that when executed by at least one processor cause a process to be carried out, the process being configured to: determine whether network connectivity has been restored between at least two predefined regions of database nodes included in a distributed database operating in a disconnected mode of operation, in response to determining network connectivity has been restored: retrieve a transaction log and a plurality of database objects from each predefined region of database nodes, each database object including one or more versions representing at least one of a database update performed prior to transitioning to the disconnected mode of operation, and a database update performed provisionally after transitioning to the disconnected mode of operation, merge each retrieved database object into a superset object, the superset object comprising a plurality of version chains, each version chain corresponding to a particular region of database nodes responsible for having created those versions based on previously committed transactions, and construct a new global state for the distributed database by: traversing each transaction log and committing non-conflicting transactions to the new global state, and causing conflicting transactions to be aborted such that a particular region of database nodes that provisionally-committed such a conflicting transaction undoes database changes corresponding to that conflicting transaction.

Example 17 includes the subject matter of Example 16, where the process is further configured to send a replication message to each database node, the replication message identifying a database object and a new version to append to that database object in accordance with each non-conflicting transaction committed to the new global state.

Example 18 includes the subject matter of any of Examples 16-17, where the process is further configured to send a message to each database node to cause each database node to switch the new global state.

Example 19 includes the subject matter of any of Examples 16-18, where the process is further configured to determine whether a transaction is conflicting or non-conflicting by comparing one or more abstract locks associated with the transaction to one or more abstract locks stored in an abstract lock collection.

Example 20 includes the subject matter of Example 19, where the process is further configured to, is in response to determining the transaction is non-conflicting, add one or more abstract locks associated with the transaction to the abstract lock collection.

The foregoing description has been presented for the purposes of illustration and description. It is not intended to be exhaustive or to limit the disclosure to the precise form disclosed. It is intended that the scope of the disclosure be limited not by this detailed description, but rather by the claims appended hereto.

What is claimed is:

1. A computer-implemented method for disconnected operation within a distributed database, the distributed database comprising a plurality of nodes, each node in the plurality of nodes implemented in a corresponding processor and a corresponding memory and communicatively coupled to each other node via at least one communication network, the distributed database including two or more predefined regions, each node of the plurality of nodes belonging to a predefined region of the two or more predefined regions, the computer-implemented method comprising:

monitoring network connectivity between a first predefined region and other predefined regions of the two or more predefined regions;

in response to detecting an interruption in the network connectivity, transitioning nodes of the plurality of nodes in the first predefined region to a disconnected mode;

provisionally committing a first database transaction by a node within the first predefined region while in the disconnected mode, wherein provisionally committing the first database transaction comprises logging a first abstract lock and a set of compensating action for the first database transaction;

determining that the network connectivity has been restored between the first predefined region and the other predefined regions of the two or more predefined regions;

in response to determining that the network connectivity has been restored, determining whether the first database transaction is a conflicting transaction;

in response to determining that the first database transaction is a conflicting transaction, aborting the first database transaction;

in response to determining that the first database transaction is not a conflicting transaction, committing the first database transaction in a transaction log;

in response to detecting the interruption in the network connectivity, transitioning nodes of the plurality of nodes in a second predefined region to the disconnected mode;

provisionally committing a second database transaction by a node within the second predefined region while in the disconnected mode;

logging a second abstract lock for the second database transaction;

determining that the network connectivity has been restored between the second predefined region and the other predefined regions of the two or more predefined regions; and in response to determining that the network connectivity has been restored, comparing the second abstract lock to the first abstract lock.

2. The computer-implemented method of claim 1, wherein monitoring the network connectivity comprises pinging, by a first node in the first predefined region, nodes in the other predefined regions.

3. The computer-implemented method of claim 2, further comprising:

in response to determining that the network connectivity has been restored, transmitting a message from the first node to an administrative node of the distributed database.

4. The computer-implemented method of claim 1, wherein monitoring the network connectivity comprises detecting network connectivity issues between the first predefined region and at least one of the other predefined regions.

5. The computer-implemented method of claim 1, wherein provisionally committing the first database transaction comprises storing the first abstract lock and the set of compensating action for the first database transaction in durable storage.

6. The computer-implemented method of claim 1, wherein provisionally committing the first database transaction comprises broadcasting a replication message to at least one other node in the first predefined region.

7. The computer-implemented method of claim 1, further comprising:

in response to determining that the network connectivity has been interrupted, suspending garbage collection in the first predefined region.

8. A computer-implemented method for operating a distributed database operating in a disconnected mode initiated in response to a loss of network connectivity between two or more predefined regions of the distributed database, the computer-implemented method comprising:

receiving, at a first node within a first predefined region of the two or more predefined regions, a first database transaction;

generating an abstract lock for the first database transaction, wherein generating the abstract lock comprises determining (i) a context identifying a database object associated with a record affected by the first database transaction, (ii) a lock type based on an abstract lock policy for a table associated with the record, (iii) a lock value based on an actual value to change in the record, and (iv) a mode based on the abstract lock policy;

preventing a second database transaction from manipulating the database object affected by the first database transaction in a destructive manner; and in response to detecting restoration of network connectivity between the two or more predefined regions, detecting a conflict between the first database transaction and the second database transaction based at least in part on the abstract lock.

9. The computer-implemented method of claim 8, wherein determining the abstract lock policy comprises defining rules for determining conflicts among database transactions.

10. The computer-implemented method of claim 9, wherein detecting the conflict comprises applying the rules defined by the abstract lock.

11. The computer-implemented method of claim 8, further comprising:
resolving the conflict according to a compensating action.

12. A computer-implemented method for operating a distributed database operating in a disconnected mode initiated in response to a loss of network connectivity between two or more predefined regions of the distributed database, the computer-implemented method comprising:
receiving, at one or more nodes within a first predefined region of the two or more predefined regions, database transactions affecting database objects stored in the distributed database;
generating respective abstract locks for the database transactions, the respective abstract locks defining rules indicating when the database transactions conflict;
in response to the distributed database returning to a normal mode of operation, identifying, based on the respective abstract locks, at least one conflict among the database transactions; and
resolving the at least one conflict, wherein generating the respective abstract locks comprises determining, for each of the respective abstract locks:
a context identifying a database object associated with an affected record,
a lock type based on an abstract lock policy for a table associated with the affected record,
a lock value based on an actual value to change in the affected record, and
a mode based on the abstract lock policy.

13. The computer-implemented method of claim 12, wherein resolving the at least one conflict comprises aborting a database transaction associated with the at least one conflict.

14. The computer-implemented method of claim 12, further comprising:
committing the database transactions that do not conflict.

15. The computer-implemented method of claim 12, further comprising:
in the disconnected mode, preventing the database transactions from manipulating the database objects in a destructive manner.

16. A computer-implemented method for operating a distributed database operating in a disconnected mode initiated in response to a loss of network connectivity between two or more predefined regions of the distributed database, the computer-implemented method comprising:
receiving, at one or more nodes within a first predefined region of the two or more predefined regions, database transactions affecting database objects stored in the distributed database;
generating respective abstract locks for the database transactions, the respective abstract locks defining rules indicating when the database transactions conflict;
in response to the distributed database returning to a normal mode of operation, identifying, based on the respective abstract locks, at least one conflict among the database transactions; and
resolving the at least one conflict,
wherein identifying the at least one conflict comprises comparing abstract locks associated with respective provisionally committed transactions.

17. The computer-implemented method of claim 16, wherein resolving the at least one conflict comprises aborting a database transaction associated with the at least one conflict.

18. The computer-implemented method of claim 16, further comprising:
committing the database transactions that do not conflict.

19. The computer-implemented method of claim 16, further comprising:
in the disconnected mode, preventing the database transactions from manipulating the database objects in a destructive manner.

* * * * *